US012472908B2

(12) United States Patent
Turner et al.

(10) Patent No.: US 12,472,908 B2
(45) Date of Patent: Nov. 18, 2025

(54) VEHICLE WASH SYSTEM HAVING DRYER MEDIA DEVICES AND AN AIR MOVING ASSEMBLY FOR REMOVING EXCESS MOISTURE FROM THE DRYER MEDIA DEVICES

(71) Applicant: Belanger, Inc, Northville, MI (US)

(72) Inventors: Barry S. Turner, Novi, MI (US);
Curtis S. Prater, Warren, MI (US);
Kimmo A. Ukkola, De Pere, WI (US);
Michael S. Sayyae, Westland, MI (US)

(73) Assignee: BELANGER, INC., Northville, MI (US)

( * ) Notice: Subject to any disclaimer, the term of this patent is extended or adjusted under 35 U.S.C. 154(b) by 665 days.

(21) Appl. No.: 17/728,322

(22) Filed: Apr. 25, 2022

(65) Prior Publication Data
US 2022/0340105 A1    Oct. 27, 2022

Related U.S. Application Data

(60) Provisional application No. 63/178,847, filed on Apr. 23, 2021.

(51) Int. Cl.
*B60S 3/00* (2006.01)
*A46B 13/02* (2006.01)
(Continued)

(52) U.S. Cl.
CPC .............. *B60S 3/002* (2013.01); *A46B 13/02* (2013.01); *B05B 16/20* (2018.02); *B08B 1/34* (2024.01);
(Continued)

(58) Field of Classification Search
CPC .... B08B 1/34; B08B 3/02; B08B 1/12; B08B 1/30; B08B 3/024; B60S 3/002;
(Continued)

(56) References Cited

U.S. PATENT DOCUMENTS 3,504,394 A   4/1970  Weigele et al.
4,166,302 A   9/1979  Kim
(Continued)

FOREIGN PATENT DOCUMENTS

JP   2004113745 A   4/2004
JP   2008007024 A   1/2008
(Continued)

OTHER PUBLICATIONS

Machine Translation of KR 20170084909 to Hyo, Jan. 2019. (Year: 2019).*

(Continued)

*Primary Examiner* — Benjamin L Osterhout
(74) *Attorney, Agent, or Firm* — Dickinson Wright PLLC

(57) ABSTRACT

A vehicle washing system includes a vehicle treatment area that is configured to receive a vehicle to be dried. At least one dryer media device is positioned in the vehicle treatment area. The at least one dryer media device is configured to dry the vehicle upon contact with the vehicle. An air moving assembly is located adjacent to the at least one dryer media device in the vehicle treatment area, and is configured to remove excess moisture from the at least one dryer media device.

14 Claims, 35 Drawing Sheets

(51) Int. Cl.
    *B05B 16/20* (2018.01)
    *B08B 1/34* (2024.01)
    *B08B 3/02* (2006.01)
    *B60S 3/04* (2006.01)
    *B05B 1/00* (2006.01)
    *B05B 1/20* (2006.01)
    *B05B 9/04* (2006.01)
    *B08B 1/12* (2024.01)
    *B08B 1/30* (2024.01)
    *B60S 3/06* (2006.01)
    *F26B 3/04* (2006.01)
    *F26B 5/14* (2006.01)
    *F26B 9/00* (2006.01)
    *F26B 21/00* (2006.01)

(52) U.S. Cl.
    CPC ............... *B08B 3/02* (2013.01); *B60S 3/04* (2013.01); *A46B 2200/3046* (2013.01); *B05B 1/005* (2013.01); *B05B 1/20* (2013.01); *B05B 1/202* (2013.01); *B05B 9/0403* (2013.01); *B08B 1/12* (2024.01); *B08B 1/30* (2024.01); *B08B 3/024* (2013.01); *B60S 3/066* (2013.01); *F26B 3/04* (2013.01); *F26B 5/14* (2013.01); *F26B 9/00* (2013.01); *F26B 21/004* (2013.01); *F26B 2210/12* (2013.01)

(58) Field of Classification Search
    CPC . B60S 3/04; B60S 3/066; B05B 16/20; B05B 1/202; B05B 1/20; B05B 1/005; B05B 9/0403; A46B 13/02; A46B 2200/3046; F26B 21/004; F26B 5/14; F26B 3/04; F26B 9/00; F26B 2210/12
    See application file for complete search history.

(56) References Cited

U.S. PATENT DOCUMENTS

| 4,250,591 | A | 2/1981 | Mello |
| 4,967,442 | A | 11/1990 | Weigele |
| 8,990,993 | B2 | 3/2015 | Belanger et al. |
| 9,328,959 | B2 | 5/2016 | Wentworth et al. |
| 9,845,080 | B2 | 12/2017 | Belanger et al. |
| 10,260,806 | B2 | 4/2019 | Wentworth et al. |
| 10,894,530 | B2 | 1/2021 | Belanger et al. |
| 2014/0259727 | A1 | 9/2014 | Belanger et al. |

FOREIGN PATENT DOCUMENTS

| KR | 20170084909 A | 7/2017 |
| KR | 102145321 B1 | 8/2020 |
| WO | 2013067385 A1 | 5/2013 |

OTHER PUBLICATIONS

Machine Translation of JP 2004113745 to Nakajima et al., Apr. 2004. (Year: 2004).*
Written Opinion of the International Searching Authority and International Search Report for International Application No. PCT/US2022/026205 mailed Sep. 12, 2022, 9 page(s).
International Preliminary Report on Patentability dated Oct. 24, 2023.

* cited by examiner

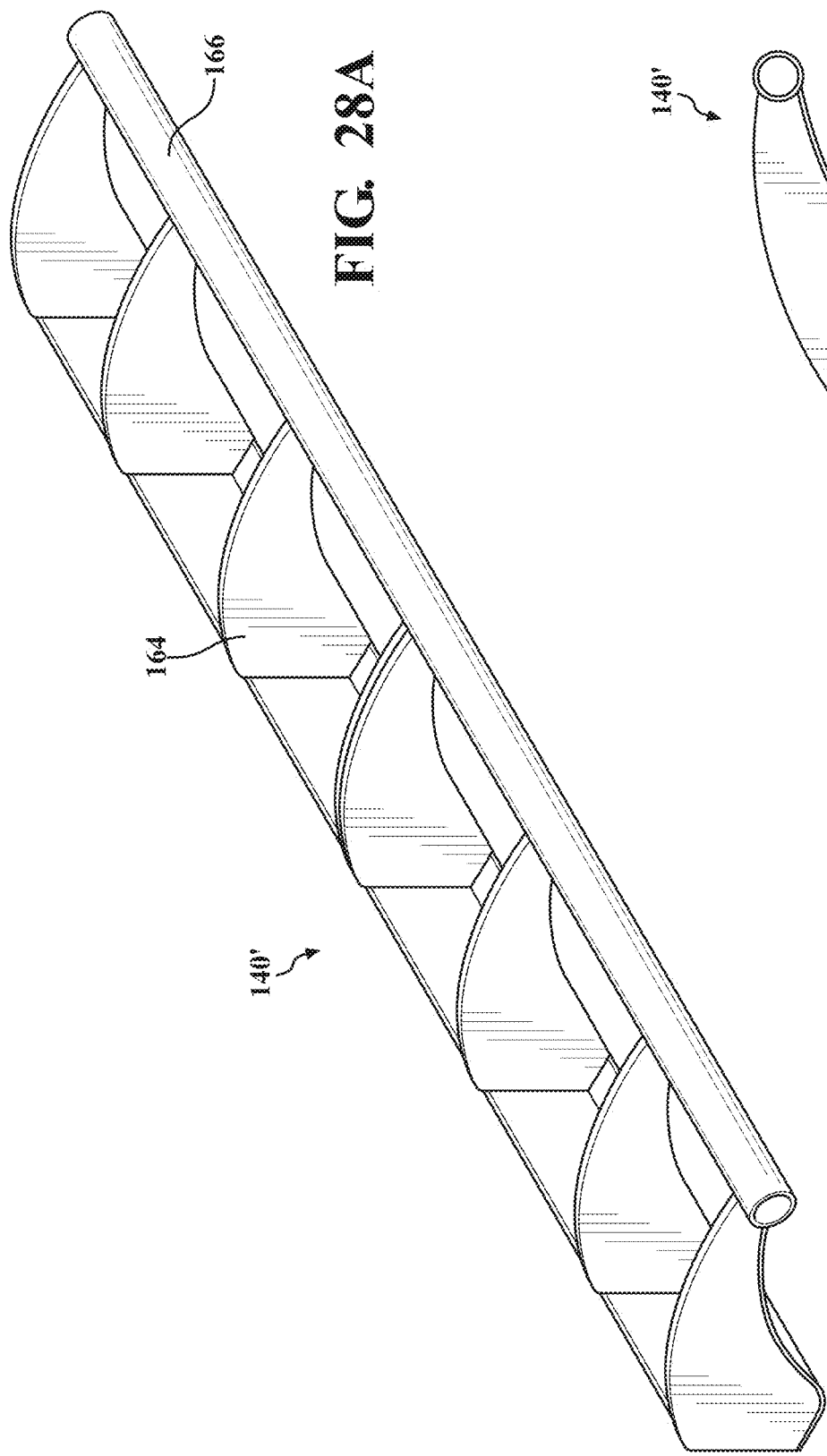
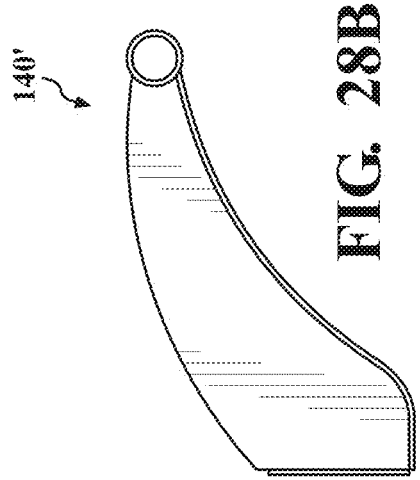
FIG. 28A
FIG. 28B

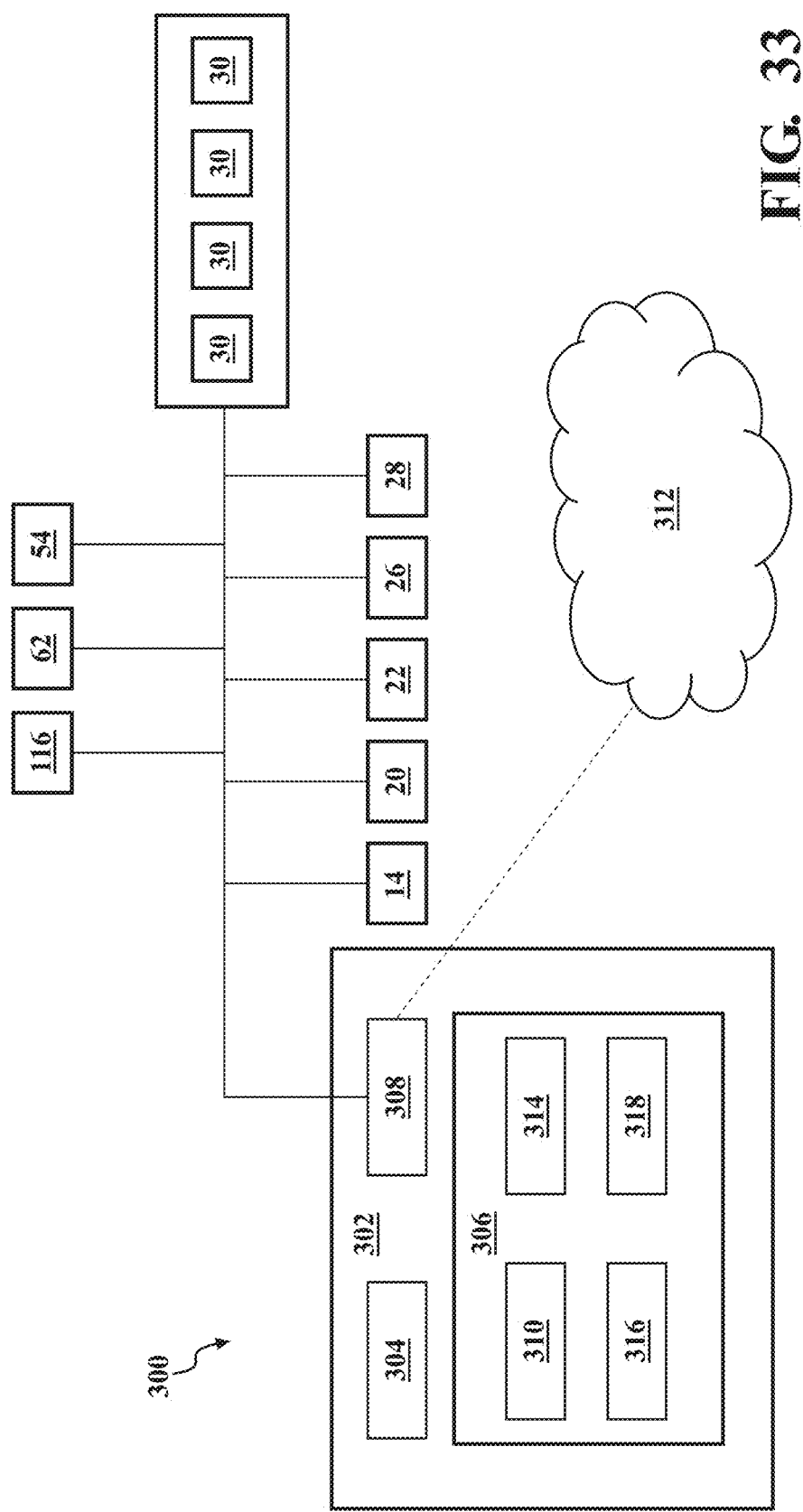

VEHICLE WASH SYSTEM HAVING DRYER MEDIA DEVICES AND AN AIR MOVING ASSEMBLY FOR REMOVING EXCESS MOISTURE FROM THE DRYER MEDIA DEVICES

CROSS-REFERENCE TO RELATED APPLICATIONS

This application claims the benefit of U.S. Provisional Patent Application Ser. No. 63/178,847, filed on Apr. 23, 2021, the entire disclosure of which is hereby incorporated by reference in its entirety.

TECHNICAL FIELD

The present disclosure relates generally to a vehicle wash system for cleaning an exterior surface of a vehicle. More specifically, the present disclosure relates to a vehicle wash system having dryer media devices and an air moving assembly that periodically removes excess moisture from the dryer media devices.

BACKGROUND

Commercial vehicle wash systems have been developed to clean and dry vehicles such as passenger and commercial vehicles quickly and efficiently. These vehicle wash systems have been developed to include a number of cleaning components that are located and oriented to clean different sections of the vehicle. For example, vehicle wash systems often include a top/horizontal brush that cleans a top surface of the vehicle and a pair of side/vertical brushes that clean side surfaces of the vehicle. The top brush is typically raised and lowered relative to the vehicle to contact the varying heights along the top surfaces of the vehicle. The top brush is also oftentimes simultaneously moved in the fore-aft direction to travel along a length of the vehicle. The side brushes, similar to the top brush, may be moveable in the fore-aft direction relative to the vehicle to cover the length of the vehicle, including the front and rear surfaces of the vehicle, and may be also moveable in the cross-car direction for closely outlining a contour of the side surfaces. Alternatively, in some vehicle wash systems, the vehicle is conveyed in the for-aft direction relative to the top brush and the side brushes in order to cover the length of the vehicle.

After the vehicle has been cleaned by the above-described cleaning components, it is beneficial to dry the vehicle to avoid water streaks and unwanted attraction of dirt and other debris. As such, these vehicle wash systems have also been developed to include a number of drying components that are located and oriented to dry different sections of the vehicle. These drying components may include a combination of dryer media devices, such as mitter curtains and brushes, and blowers. In operation, at least one dryer media element is moved into contact with a surface of the vehicle and removes liquid via absorption. However, over time these dryer media devices are known to become saturated and accumulate debris and dirt, which can both hinder drying and damage vehicles.

Accordingly, there is a continuing desire to further develop vehicle wash systems to include drying components with improved functionality.

SUMMARY OF THE DISCLOSURE

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

It is therefore an aspect of the disclosure to provide a vehicle wash system that includes at least one dryer media device, such as a brush and/or mitter curtain, and an air moving assembly that is configured to remove excess moisture from the at least one dryer media device.

According to these and other aspects of the disclosure, a vehicle washing system includes a vehicle treatment area that is configured to receive a vehicle. At least one dryer media device is positioned in the vehicle treatment area. The dryer media device is configured to dry the vehicle upon contact with the vehicle. An air moving assembly is located adjacent to the at least one dryer media device in the vehicle treatment area, and is configured to remove excess moisture from the at least one dryer media device.

It is another object of the disclosure to provide a dryer media cleaning assembly that is configured to clean a dryer media device in a simple manner with various solutions.

According to this and other objects of the disclosure, another vehicle washing system includes a vehicle treatment area configured to receive a vehicle. At least one dryer media device is positioned in the vehicle treatment area. The at least one dryer media device is configured to dry the vehicle upon contact with the vehicle. A dryer media cleaning assembly is located adjacent to the at least one dryer media device and is configured to apply a fluid to the at least one dryer media device to clean the at least one dryer media device.

It is another object of the disclosure to provide a chemical applicator that is configured to detail a vehicle after it has undergone a washing treatment.

According to this and other aspects of the disclosure, a vehicle washing system comprises a vehicle treatment area configured to receive a vehicle. A washing assembly is located in the vehicle treatment area for washing the vehicle. At least one dryer media device is located in the vehicle treatment area and is configured to dry the vehicle upon contact with the vehicle after the vehicle has been treated by the washing assembly. A chemical applicator is configured to apply a process chemical to the vehicle for enhancing an appearance of the vehicle after the vehicle has been treated by the washing assembly.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 28A is a perspective view of a nozzle manifold of the second alternate embodiment of the air moving assembly;

FIG. 28B a side view of the nozzle manifold of the second alternate embodiment of the air moving assembly;

FIG. 33 is a schematic illustration of a control system of the vehicle wash system.

DETAILED DESCRIPTION OF THE DISCLOSURE

Example embodiments will now be described more fully with reference to the accompanying drawings. In general, the subject embodiments are directed to a vehicle cleaning system including a dryer media devices for drying a vehicle after it has been cleaned, and an air moving assembly for keeping the dryer media devices in a non-saturated state between cycles. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the figures, wherein like numerals indicate corresponding parts throughout the several views, a vehicle cleaning system is illustrated. The vehicle cleaning system includes at least one dryer media device for drying a vehicle after it has been cleaned, and an air moving assembly for keeping the at least one dryer media device in a non-saturated state between cycles. The vehicle cleaning system improves upon the operational framework and efficiency of traditional cleaning systems that have been used to clean and dry a vehicle body.

The present disclosure relates to a vehicle wash system, which may be configured as a rollover type system where the vehicle remains stationary and the various treatment components may be moved with respect to the vehicle, a conveyor type system where the vehicle is moved with respect to the vehicle wash system, or a combination thereof. As is known to one of ordinary skill in the art, a vehicle wash system utilizes various components that treat a vehicle in a predetermined sequence to both clean and dry the vehicle. It will be appreciated that the various aspects, components, or portions of the disclosed vehicle wash system may be employed in connection with a variety of other applications outside of a rollover or conveyor vehicle wash system, such as a manual wash or self-service wash process.

Figure 1:
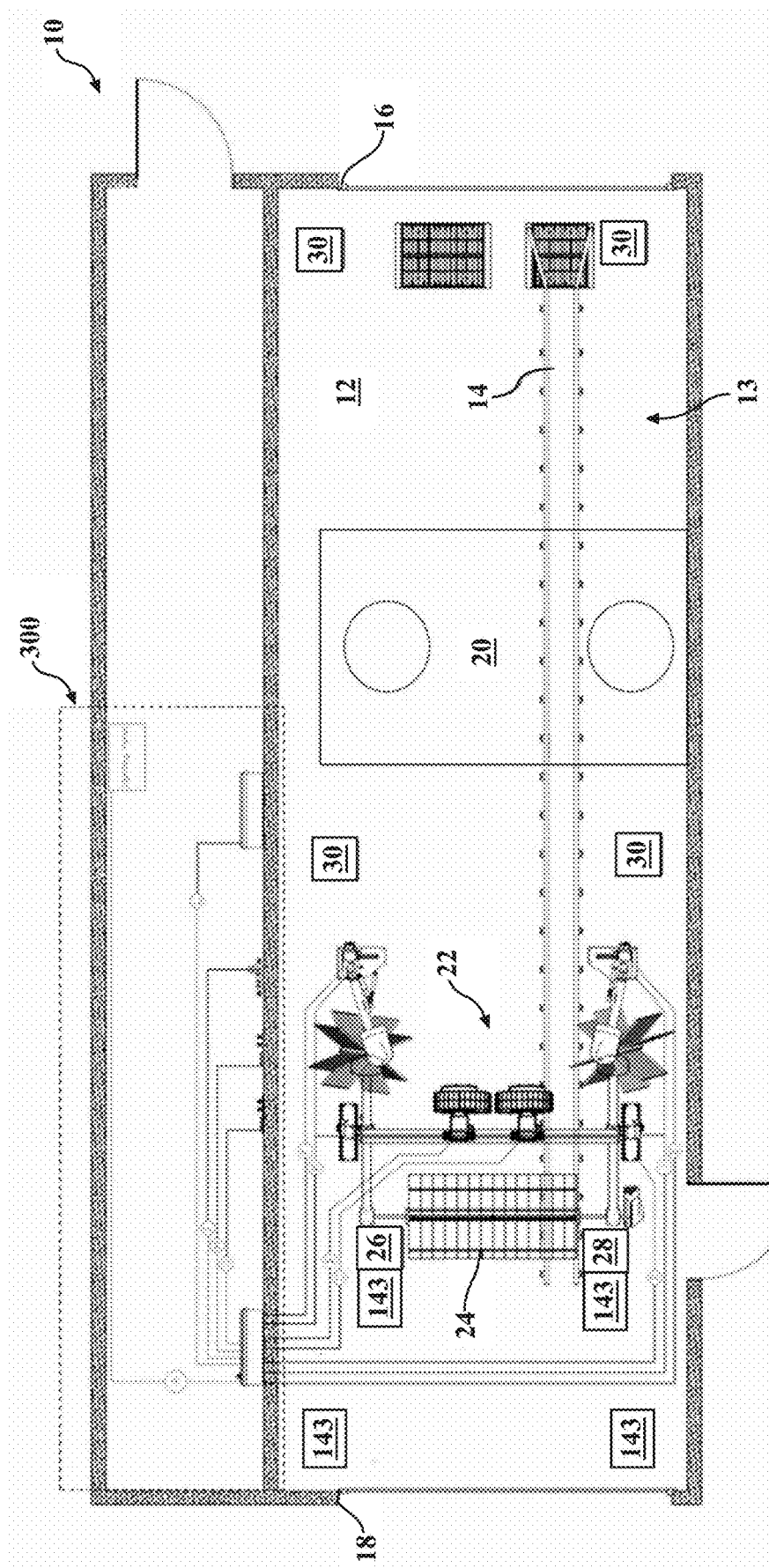
FIG. 1 illustrates a top view of a vehicle wash system including vehicle treatment area with a variety of cleaning and drying components.

With initial reference to FIG. 1, the vehicle wash system 10 is shown. The vehicle wash system 10 may be primarily located within a building or bay 12. According to the example embodiment, the interior of the bay 12 constitutes a vehicle treatment area 13 which extends between an entry 16 and an exit 18. In some embodiments, the vehicle wash system 10 is a conveyor type system and include a conveyor assembly 14 that extends between the entry 16 and the exit 18. It should be appreciated that the vehicle treatment area 13 generally constitutes the region in which the vehicle is treated with washing and/or drying and detailing treatments, and may have other configurations than those shown in the example embodiments. For example, part of the vehicle treatment area 13 could be located outside of a bay 12. In use, the conveyor assembly 14 moves a vehicle between components of the vehicle wash system 10 within the bay 12. In some embodiments, the vehicle wash system 10 may include a washing assembly 20 that may include a number of spray nozzles, washing brushes, other components, or combinations thereof. A drying assembly 22 may be located within the vehicle treatment area 13 between the exit 18 and the washing assembly 20. The drying assembly 22 may include at least one dryer media device 24, such as a drying bush 24/62. The dryer media device 24 may include various other types of vehicle drying components, including but not limited to, various other types of brushes or a hanging curtain like a mitter cloth. The drying assembly 22 may also include an air moving assembly 26 configured to prevent the at least one dryer media device 24 from being in an oversaturated condition at the start of a new cycle, and a dryer media cleaning assembly 28 that holds at least one cleaning medium and applies the at least one cleaning medium on the at least one dryer media device 24 after a predetermined amount of time and/or cycles, or a combination thereof.

A chemical applicator 143 may be provided for applying a chemical to the vehicle for enhancing an appearance of the vehicle after the vehicle has been treated by the washing assembly 20. As schematically illustrated in FIG. 1, the chemical applicator 143 may be positioned at various locations, such as on equipment associated with the drying assembly 22 (discussed in further detail below) or between the at least one drying assembly 22 and the exit 18. The chemical may include various treatment chemicals including, but not limited to a detail spray a wax, a conditioner, a spray on polish compound or other surface treatment agents. It should be appreciated that a supplementary media device such as a brush could be employed after application with the chemical application 143 to polish the vehicle surface without water.

A control system 300 (FIGS. 1 and 33) may control certain actions and sequences of the vehicle wash system 10. In some embodiments, the control system 300 may be primarily located outside of the bay 12 and include a series of user interfaces, control panels, override switches, or combinations thereof. The vehicle wash system 10 may further include at least one or a plurality of sensors 30 located on any of the afore described assemblies, located within portions of the bay 12, or a combination thereof. The plurality of sensors 30 may be configured to determine vehicle location, size, moisture level, dirt presence, saturation level of components (e.g., the at least one dryer media device 24), a weight of the dryer media devices, or a combination thereof. A sensed presence or a predetermined level determined by the sensors 30 may be communicated to the control system 300 and cause various actions that will be described in greater detail below.

Figure 2:
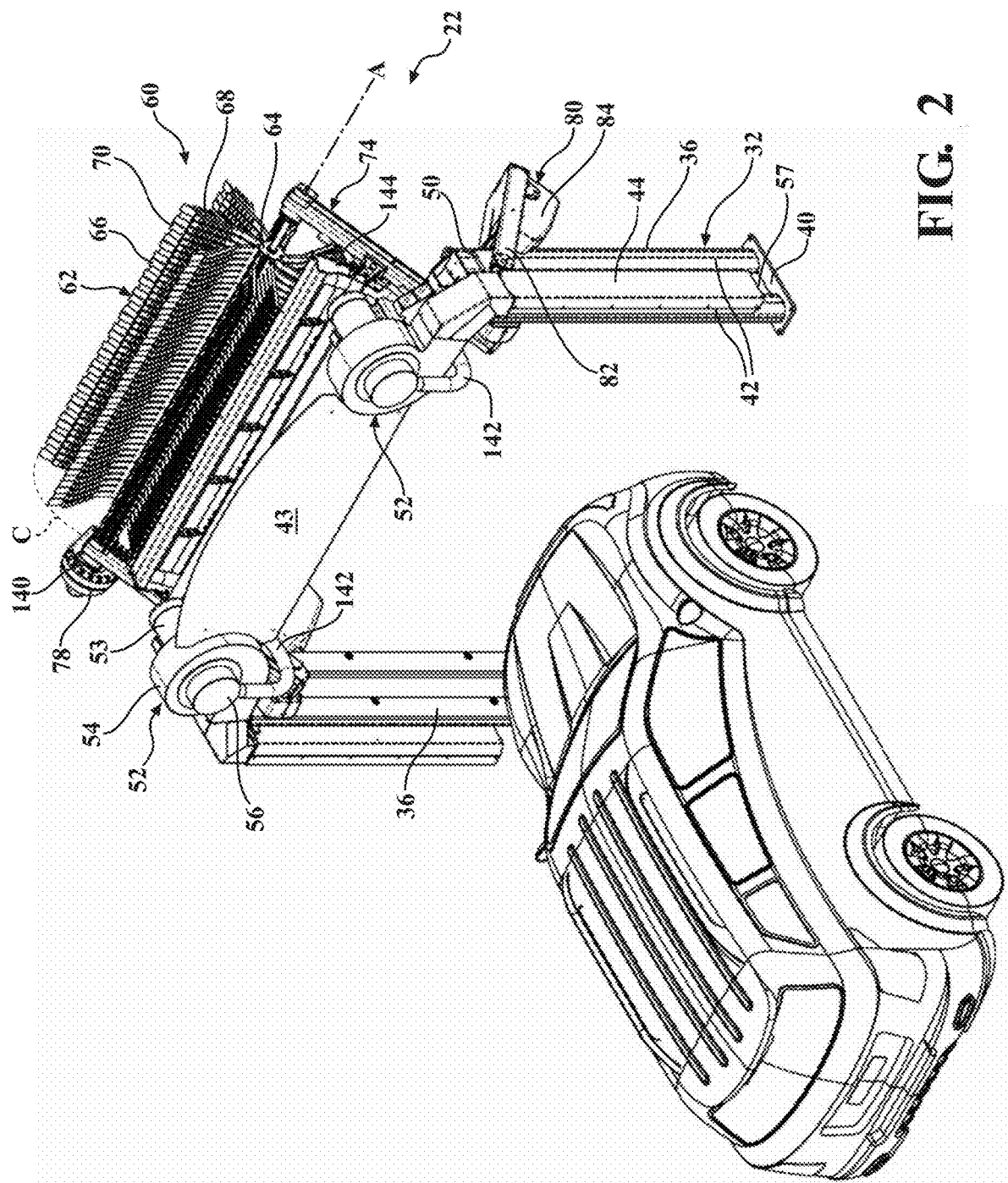
FIG. 2 illustrates a perspective view of a drying assembly including a frame and a top dryer media device located on the frame, and illustrating a vehicle approaching the drying assembly.
Figure 3:
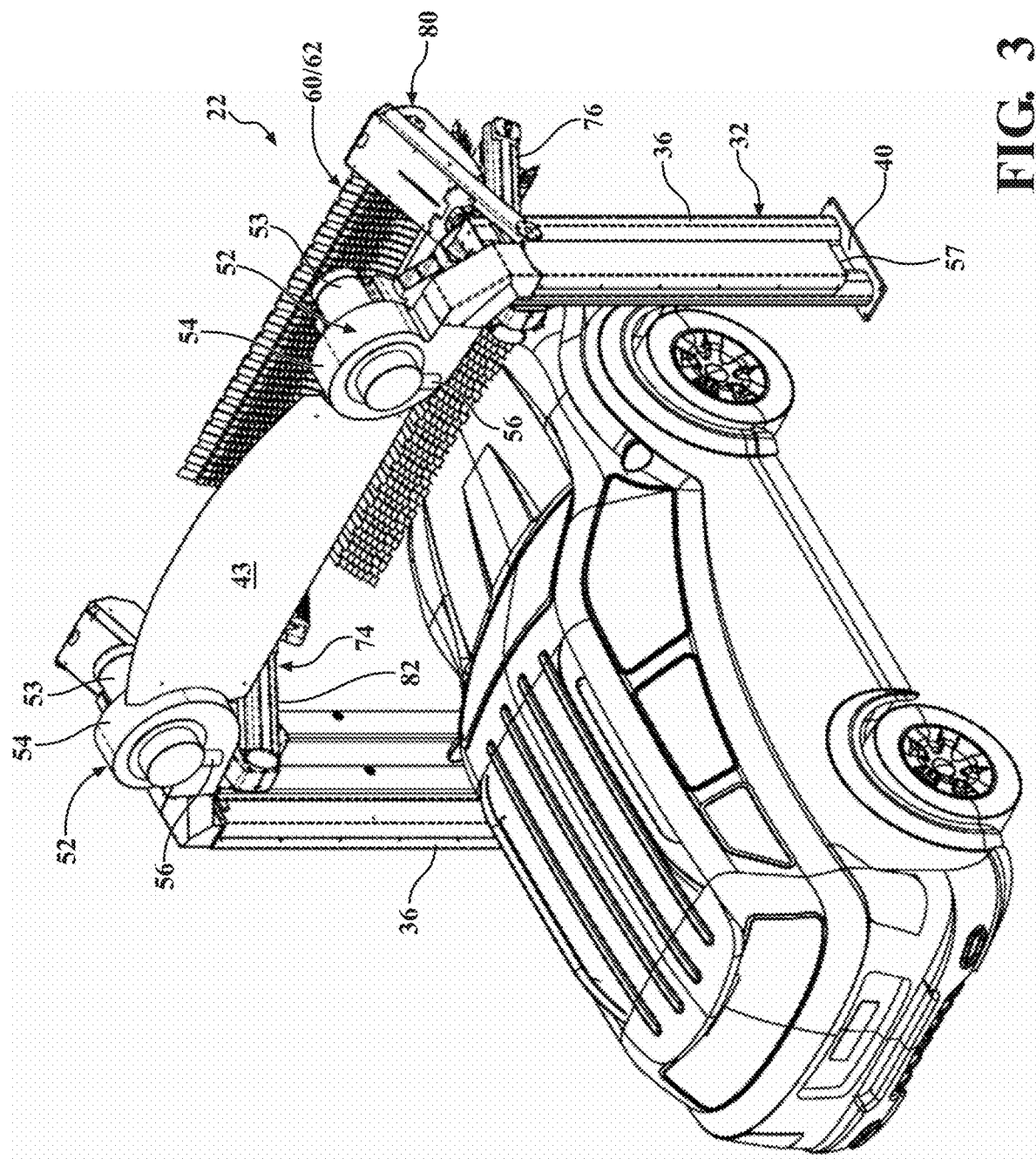
FIG. 3 illustrates a perspective view of the drying assembly, illustrating the vehicle in contact with the drying assembly in a first position.
Figure 4:
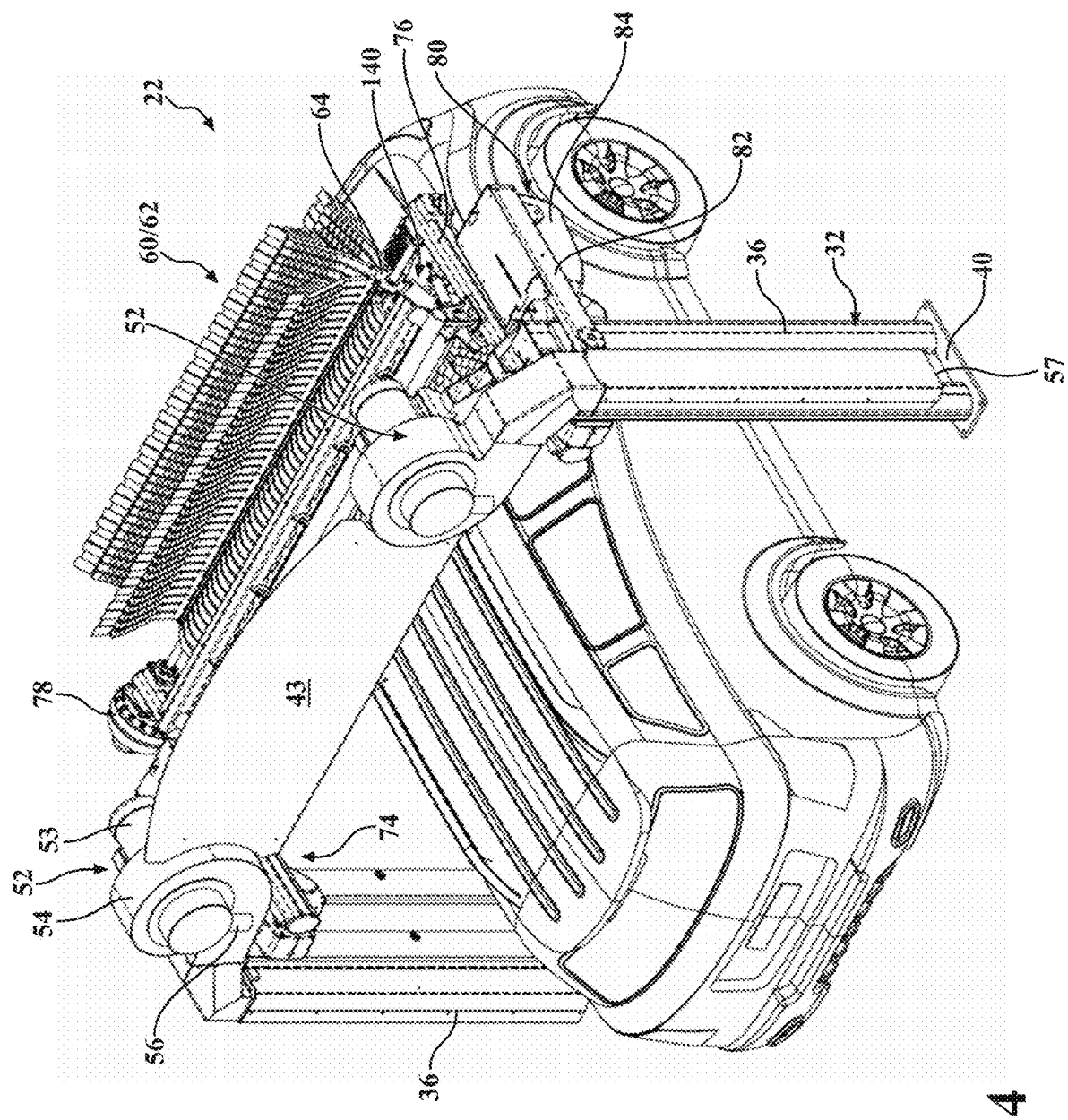
FIG. 4 illustrates a perspective view of the drying assembly, illustrating the vehicle in contact with the drying assembly in a second position.

As best shown in FIGS. 2-6, various components of an example embodiment of a drying assembly 22 are more specifically illustrated. The drying assembly 22 includes a frame 32 for locating various components of the drying assembly 22. The frame 32 includes a pair of vertical supports 36 spaced by a crossbeam 38. In some embodiments, the vertical supports 36 may be stationary and include floor mount sections 40. During usage, the vertical supports 36 extend from a floor of the bay 12 towards a ceiling of the bay 12, and are spaced to be located on opposite sides of a vehicle in the cross-car direction. The crossbeam 38 is connected to top portion of the vertical supports 36 such that it is located over a top surface of a vehicle (see, e.g., FIGS. 3 and 4). As illustrated in FIG. 2, in some embodiments, each of the vertical supports 36 includes two vertical beams 42 spaced in a generally perpendicular relationship by one or more crossbars 44. The crossbeam 38 may extend between vertical beams 42 of opposite vertical supports 36 and include a uniform cross-section along at least a portion thereof to permit components of the drying assembly 22 to be moved therealong. A display 43, such as for presenting treatment information to customers may be located between the vertical beams 42 along the crossbeam 38. The display 43 may be configured to include various types of indicia, e.g., a graphic display or LEDs, and the display may be actively changed manually or via the controller 302. It should be appreciated that in some embodiments the frame 32, components of the washing assembly 20, or combinations thereof may be configured as a rail type system disclosed in U.S. Pat. No. 10,894,530, issued Jan. 19, 2021, and titled "VEHICLE WASH SYSTEM HAVING A VERTICALLY OPERATED TOP BRUSH WITH A SCISSOR SUPPORT MECHANISM", the contents of which are hereby incorporated by reference in its entirety.

The drying assembly 22 may further include at least one blower assembly 52. The blower assembly 52 may include a motor 53, an impeller housing 54, a discharge nozzle 56 and an intake/outtake 57. As will be discussed in further detail below, the blower assembly 52 may be configured to create a suction effect or high velocity airflow affect against the dryer media devices 24/62 to effectuate the removal of excess moisture from the dryer media devices 24/62. Accordingly the intake/outtake 57 may serve to either draw in or expel air.

Figure 14:
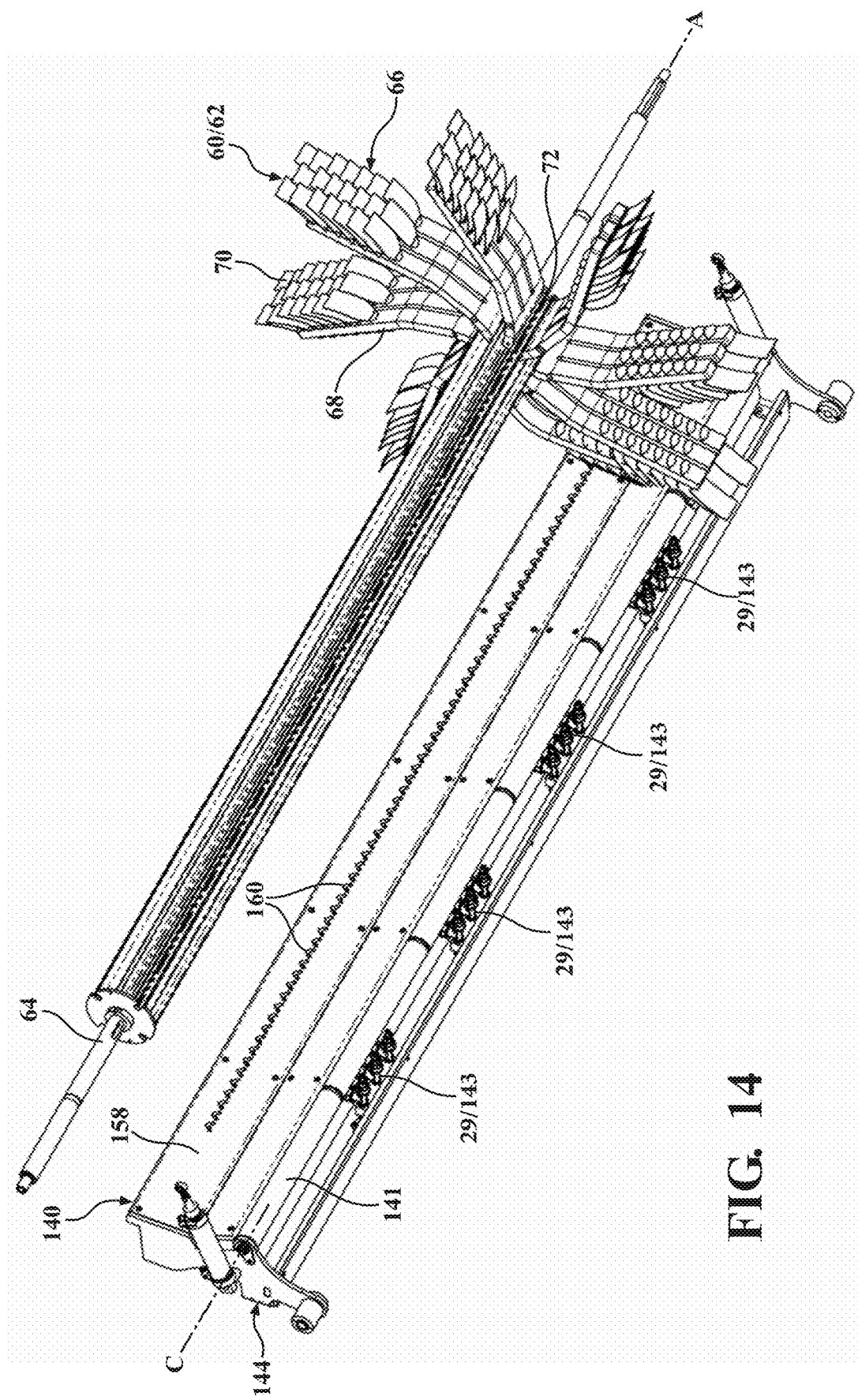
FIG. 14 is a front perspective view of the nozzle manifold of the first example embodiment of the air moving assembly, illustrating operational interaction with dryer media devices.

The at least one dryer media device 24 may include a top dryer media device of a top dryer media device assembly 60 that may be connected to the frame 32. The top dryer media device 62 extends at least partially between the vertical supports 36. The top dryer media device 62 may include a hub portion 64 that extends along, and is rotatable about a hub axis A (see, e.g., FIG. 1). As illustrated in FIG. 14, the top dryer media device 62 also includes a plurality of media elements 66 that extend radially outwardly from the hub portion 64 in a circumferential array. The media elements 66 may be free standing and comprise a ply portion 68 defining a plurality slots and a plurality of drying portions 70 extending from the slots. In some embodiments, the media elements 66, the ply portions 68, the drying portions 70, or combinations thereof may be formed of an absorbent material, a non-absorbent material, a microfiber material, a polyester, a felt, a nylon, a wool, a quick-dry material, or a combination thereof. As illustrated in FIG. 14, spacer members 72 may circumferentially space the media elements 66. As shown in FIG. 2, during rotation, the dryer media device 62 defines a working circumference C at a radially outer perimeter of the dryer media device. In some embodiments, the top dryer media device 62 may be configured as a brush disclosed in International Application No. PCTUS2012/063368, published May 10, 2013, and titled "AN IMPROVED VEHICLE WASH COMPONENT", the contents of which are hereby incorporated by reference in its entirety. In some embodiments, the dryer media device may include portions constructed of an EVA foam and may be generally self-supporting along their length disclosed in U.S. Pat. No. 8,990,993, issued Mar. 31, 2015, and titled "VEHICLE WASH COMPONENT", the contents of which are hereby incorporated by reference in its entirety.

The top dryer media device 62 may be connected to the frame 32 via a top brush frame 74. The top brush frame 74 may include a pair of arms 76 spaced on opposite ends of the top dryer media device 62. The arms 76 extend between a first end and a second end and may be pivotally connected to the frame 32 at the first end and moveable between a vehicle engagement position (e.g., FIGS. 3 and 4) wherein the media elements 66 contact a surface of the vehicle, and a non-engagement position (e.g., FIGS. 2 and 5) wherein the media elements 66 are spaced from the surface of the vehicle. The top dryer media device 62 may connect to the second end of the arms 76 via the hub portion 64. At least one driving motor 78 may be located on or near the second end of one of the arms 76 for causing the hub portion 64 to rotate and further causing conjoint rotation of the media elements 66. In some embodiments, the at least one driving motor 78 is located on the second end of one of the arms 76 and travels with the arms 76 between the engagement and non-engagement positions. In some embodiments, the at least one driving motor 78 includes a pair of driving motors 78 located on the second end of each of the arms 76 and that travel with the arms 76 between the engagement and non-engagement positions. In some embodiments, the driving motor 78 is operably connected to at least one arm 76 through a gear arrangement (e.g., a bevel gear) to provide a desired gear reduction.

As shown, a counterweight device 80 may be operably connected to at least one of the arms 76 to facilitate movement of the top dryer media device 62 between the engagement and non-engagement positions. The counterweight device 80 may include a counterweight arm 82 and a counterweight block 84 connected to the counterweight arm 82. In some embodiments, the counterweight block 84 is adjustable along a length of the counterweight arm 82 for adjusting the degree of counterweight asserted by the counterweight device 80. In some embodiments, the counterweight block 84 includes a plurality of counterweight blocks 84 of varying weights that are selectively connected and/or removed along the length of the counterweight arm 82 for adjusting the degree of counterweight asserted by the counterweight device 80. In some embodiments, the counterweight device 80 includes a pair of counterweight devices 80 with one of the counter weight devices 80 operably connected to each of the arms 76.

Figure 18:
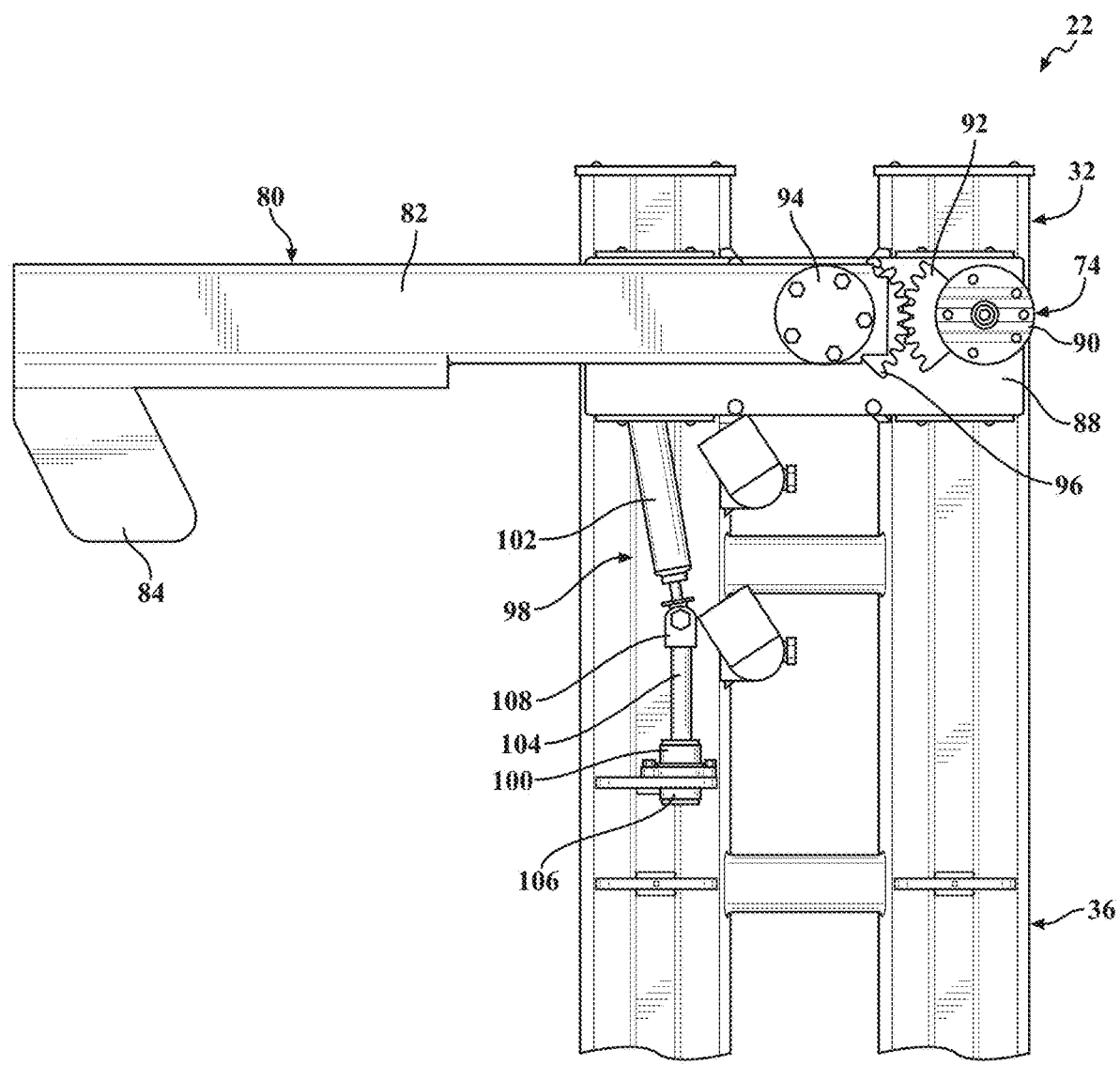
FIG. 18 is a side view of an example embodiment of an arm adjustment actuator arrangement for moving the dryer media devices.

The arms 76 may each connect to associated vertical support 36 via a connection bracket 86. FIG. 18 shows an example arrangement of such a bracket 86. The connection bracket 86 may include a pair of plates 88 extending between the vertical beams 42 with one plate 88 on an inner side of the vertical supports 36 and the other plate 88 on an outer side of the vertical supports 36. Each arm 76 may be connected to the connection bracket 86 with an arm pivot shoulder 90 that extends through and is moveable relative to at least one of the plates 88. An end of the pivot shoulder 90 may define a series of teeth 92 located between the plates 88. In some embodiments, the counterweight device 80 includes a counterweight shoulder 94 that extends through and is moveable relative to at least one of the plates 88 (e.g., from an opposite direction of the pivot shoulder 90). The counterweight shoulder 94 may likewise include a series of teeth 96 located between the plates 88 and in meshed engagement with the teeth 92 of the pivot shoulder 90. In use, when the arms 76 are articulated between positions, the teeth 92 via interaction with the teeth 96 of the counterweight shoulder 94 cause opposite pivotal movement of the counter weight device 90 thereby requiring less force to move the top dryer media device 62.

With continued reference to FIG. 18, one or more arm adjustment actuators 98 may facilitate movement of the arms 76. The arm adjustment actuator 98 may include a driving portion 100 and a damper portion 102. In operation, the driving portion 100 may drive the arms 76 between the engagement and non-engagement positions and the damper portion 102 may prevent and/or minimize a force exerted on a vehicle by the top dryer media device 62. In some embodiments, the driving portion 100 may include a lead screw 104 driven by a motor 106 that connects to the damper portion 102 with a pivot linkage 108. In some embodiments, the driving portion 100 may include a pneumatic piston or a hydraulic operated piston actuator. In some embodiments, the damper portion 102 includes piston-type damper that extends between the driving portion 102 and one of the arms 72. In some embodiments, the driving portion 100 and the damper portion 102 are located within one of the vertical beams 42 that protects portions of the driving portion 100 and the damper portion 102 from fluids associated with the vehicle wash system 10. In some embodiments, the driving portion 100 and the damper portion 102 include a pair of driving portions 100 and the damper portions 102 located in opposite arms 76.

Figure 19:
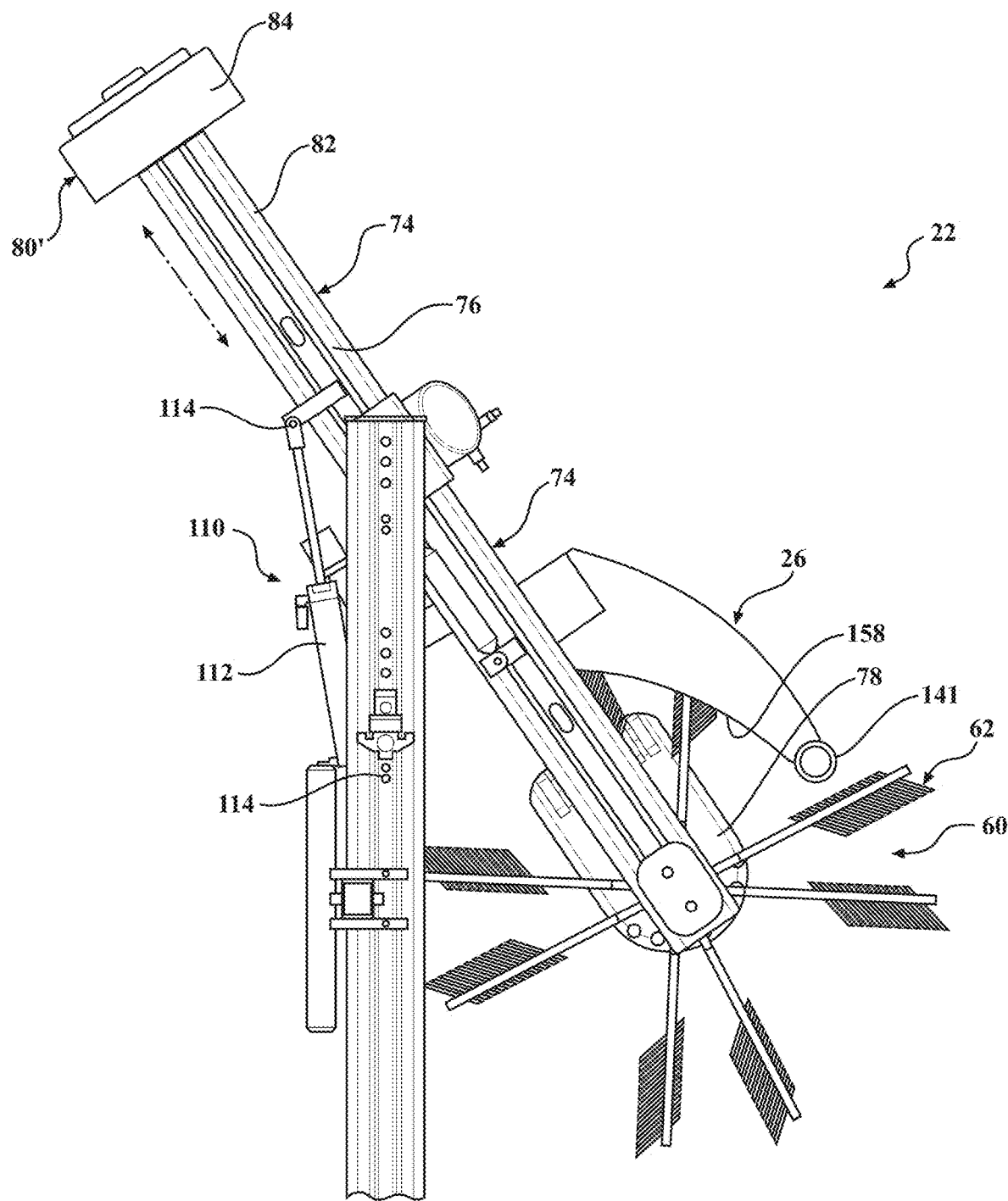
FIG. 19 is a side view of the example embodiment of the arm adjustment actuator, illustrating use of a counterweight.

As best illustrated in FIG. 19, according to another example embodiment, the pivot shoulder 90 is slideably connected to the arm 76 and the arm 76 includes a slide adjustment mechanism 110 that moves the arm lengthwise with respect to the pivot shoulder 90. The slide adjustment mechanism 100 includes an arm length actuator 112 that extends between a first connection bracket 114 on the arm 76 and a second connection bracket located on the frame 32 (e.g., the vertical support 36). The arm length actuator 112 may be pivotally connected to the first connection bracket 114 and the second connection bracket, and may be configured to expand and contract to move the arm 76 with respect to the pivot shoulder 90. The arm length actuator 112 may include a lead screw mechanism, a rack and pinion gear, a pneumatic piston actuator, a hydraulic operated piston actuator, other linear adjustment mechanisms or combinations thereof. It should be appreciated that FIG. 19 illustrates a counterweight device 80' in accordance with another embodiment, wherein a weight is located on an end of each arm 76 opposite the dryer media devices assembly 60. In some embodiments, there are a series of vertical settings 115 for connecting the second connection bracket.

Figure 20:
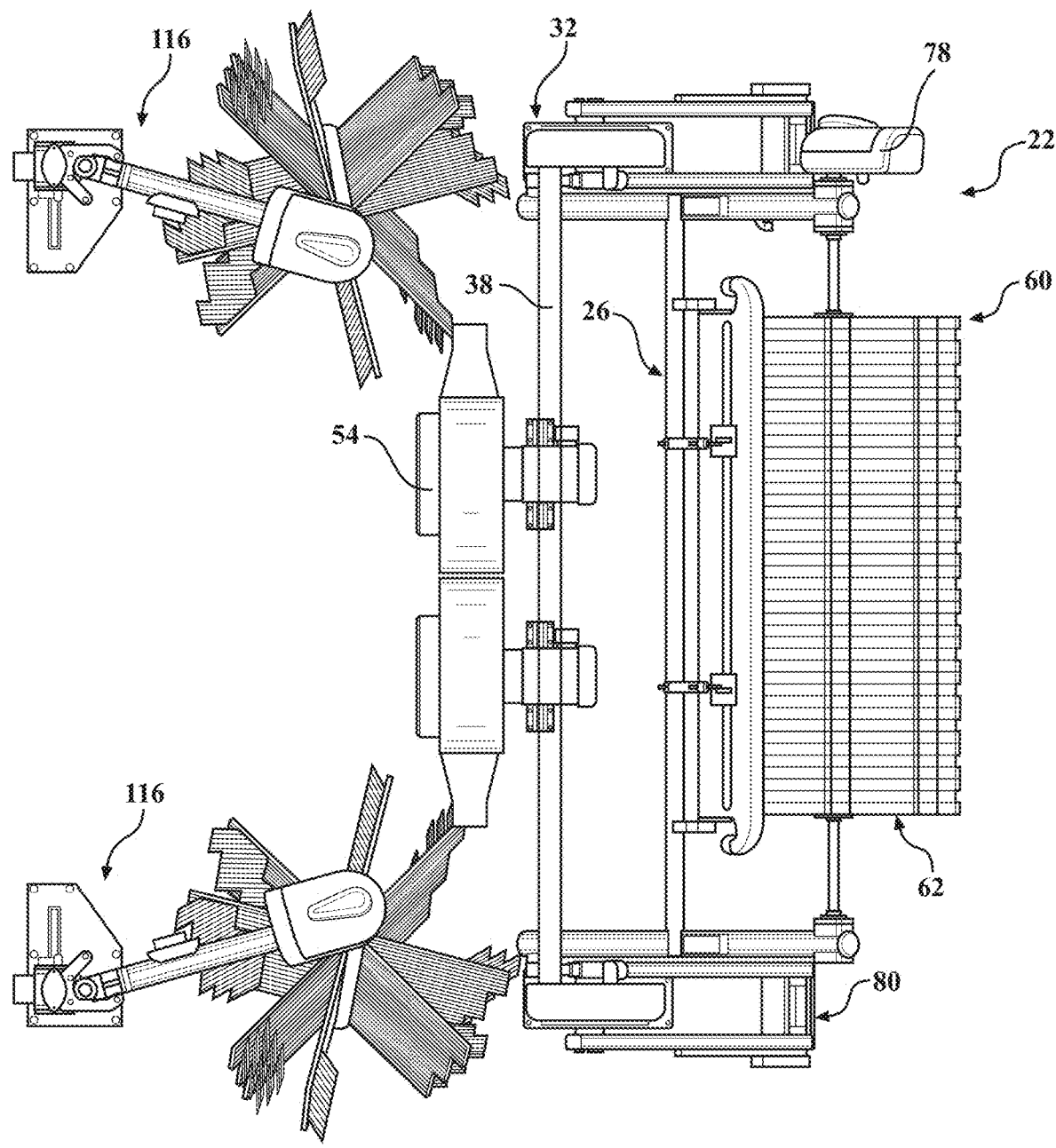
FIG. 20 is a top view of an example arrangement of dryer media devices configured as vertical dryer brushes.
Figure 21:
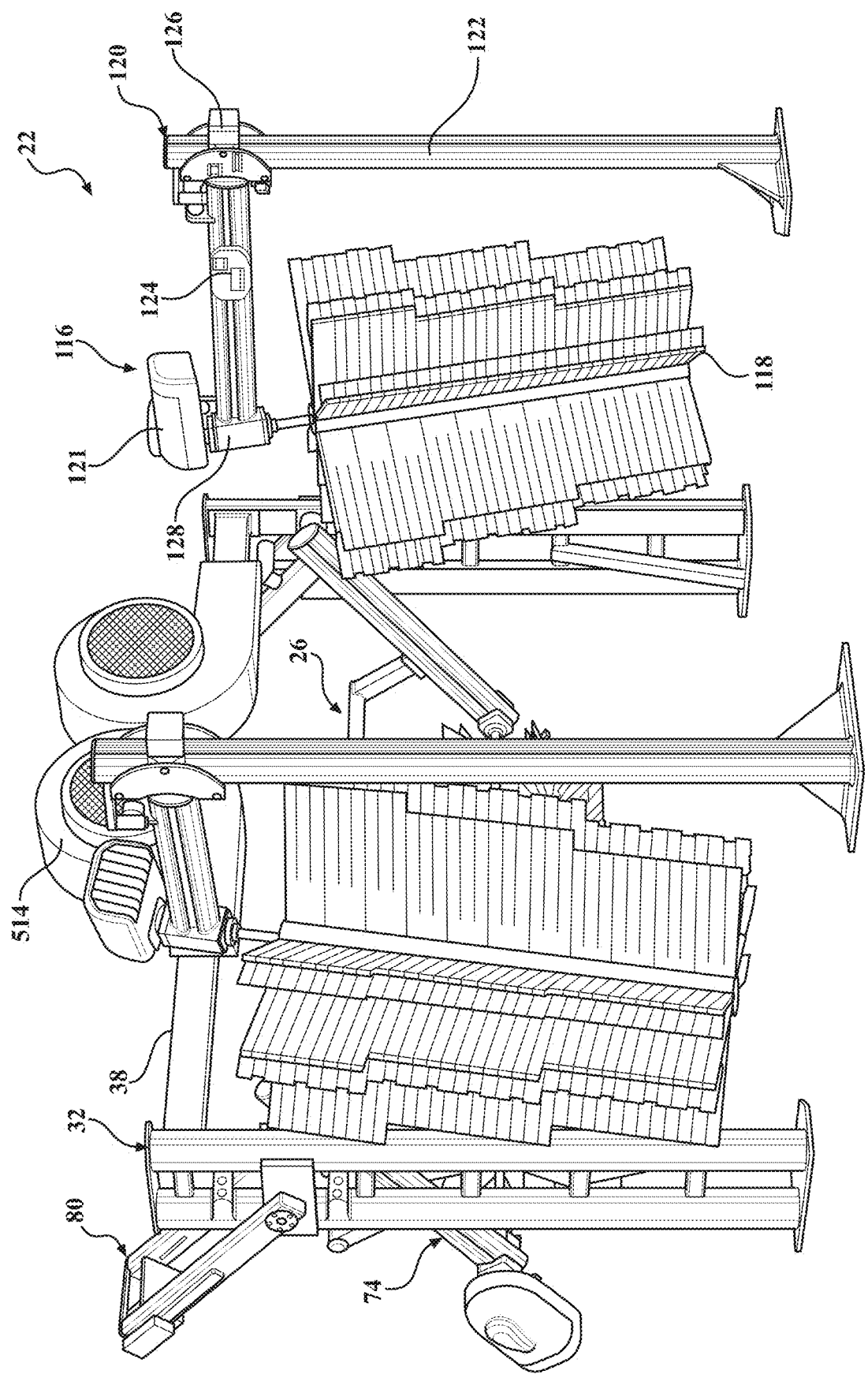
FIG. 21 is a perspective view of the example arrangement of vertical dryer media devices.

With reference now to FIGS. 20-21, the dryer media device 22 may further include at least one vertical/side dryer assembly 116. The vertical dryer assembly 116 may be located near the frame 32. It should be appreciated that the subject system may be constructed with or without the vertical dryer assembly 116. Each vertical dryer assembly 116 may include a vertical dryer bush 118 that may share all the same elements, materials, and functionalities as those described in reference to the top dryer brush 62 (including the air moving assembly components discussed below). Each vertical dryer brush 118 may be located on a vertical brush frame 120 that includes a vertical section 122 and a horizontal section 124 connected by a brace 126. The vertical dryer brush 118 may connected to an end of the horizontal section with a vertical dryer brush connection 128 opposite the brace 126 and may be driven by a motor 121. In some embodiments, the vertical section 122 may be articulated relative to the horizontal section 124 via the brace 126 and the vertical dryer brush 118 may be articulated relative to the horizontal section 124 via the vertical dryer brush connection 128. In some embodiments, vertical dryer brush assembly 116 may include a pair of vertical dryer brush assemblies 116 located for drying opposite side surfaces of a vehicle. In some embodiments, the vertical dryer brush assembly 116 may be configured as and/or share similar components as the brushes disclosed in U.S. Pat. No. 9,845,080, issued Dec. 19, 2017, and titled "WRAP-AROUND VEHICLE WASH COMPONENT", the contents of which are hereby incorporated by reference in its entirety.

Figure 22:
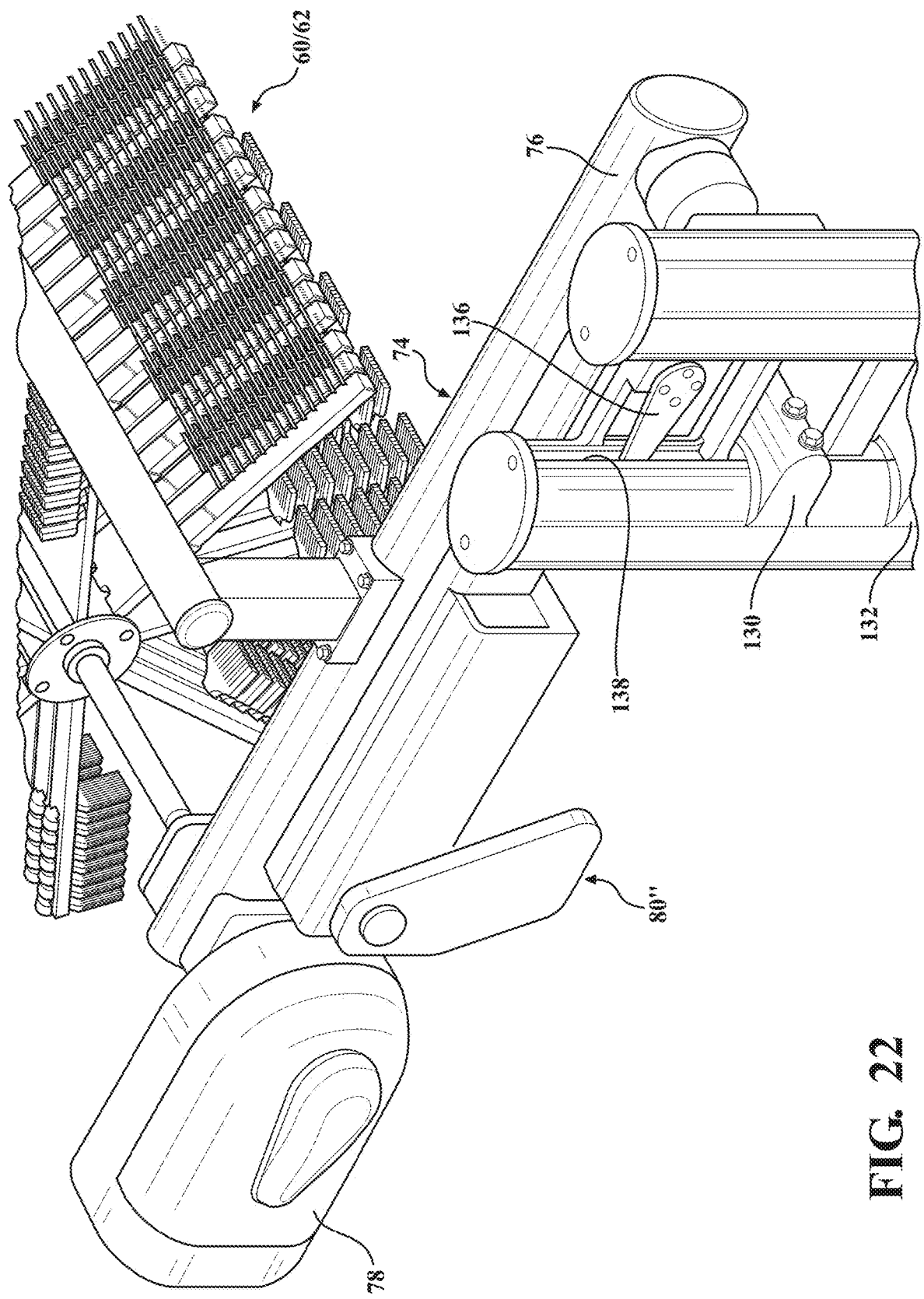
FIG. 22 is a perspective view of the drying assembly showing a second embodiment of a counterweight device, wherein the counterweight device and a dryer media device arm are separate components, and further illustrating a rotating gear motor for the dryer media device.
Figure 23:
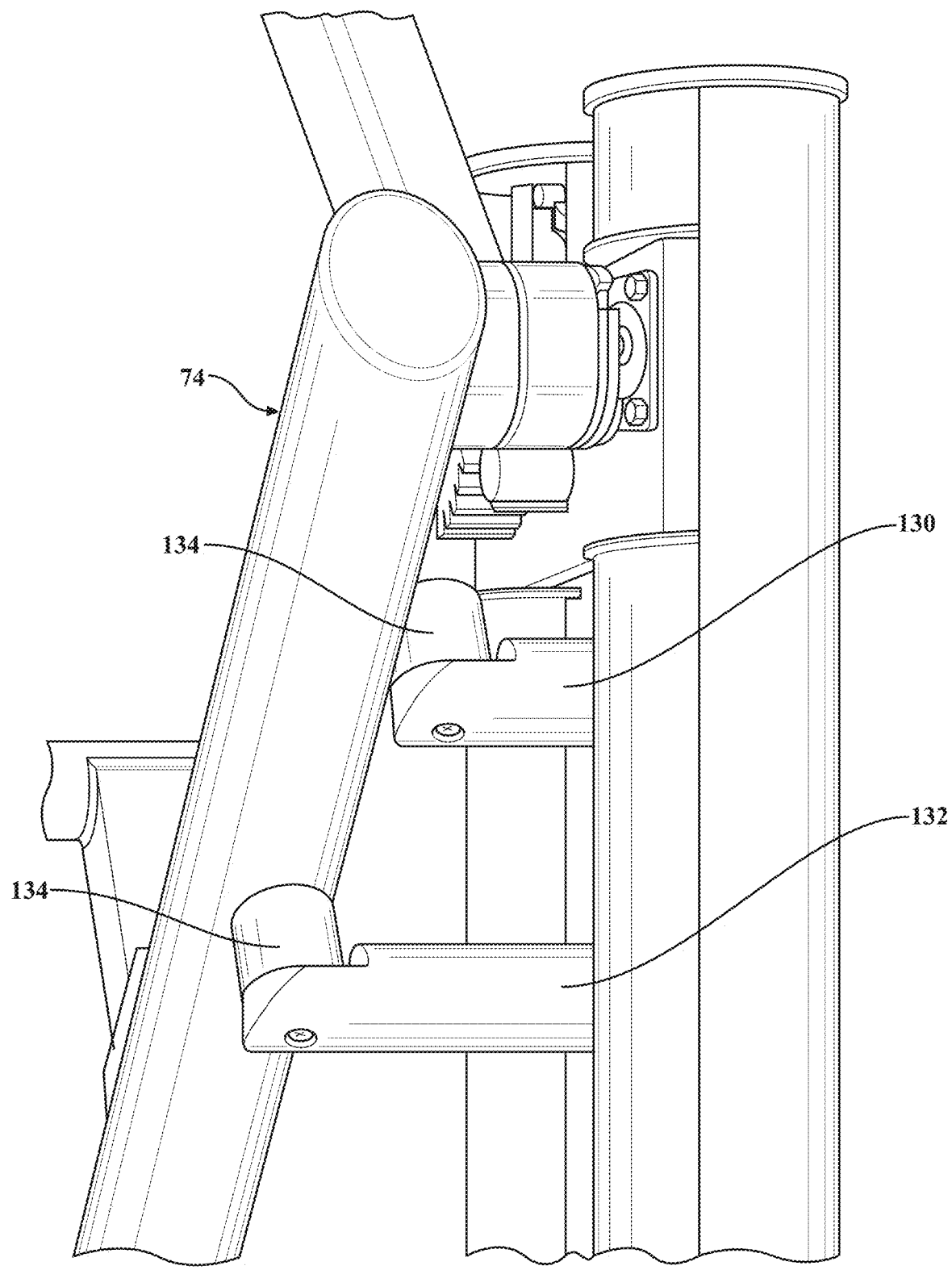
FIG. 23 is a perspective view of the second embodiment of a counterweight device, illustrating a pair of damping members that limit a range of motion and serve as a dampening hard stop for the counterweight device and arms of a top brush frame.

FIGS. 22-23 illustrate yet another embodiment of the counterweight device 80". As shown, the counterweight device 80" is located between the motor 78 and the pivot shoulder 90 on an interior side of the frame 32. The counterweight device 80" may otherwise share the same features, materials, elements, and functionalities of the other embodiments of the counterweight device. In some embodiments, the connection bracket 86 and/or a location of the frame 32 adjacent thereto may include a first damper member 130 for limiting motion and providing a dampening hard stop for the counterweight device and a second damper member 132 for limiting motion and providing a dampening hard stop for the arms 72. Each dampening member 130, 132 may include an elastic tip 134 (FIG. 23). A detent 136 may be guided within a slot 138. Edges of the slot 138 may further include a hard stop to the counterweight device, the arm, or both. A sensor 30 may measure the travel of the detent 136 when the top dryer media device 62 is outlining a contour of a vehicle.

FIGS. 2-17 illustrate the air moving assembly 26 in accordance with a variety of embodiments. The air moving assembly 26 may employ strong outward airflow, strong inward airflow (i.e., a vacuum), or a combination thereof for removing excess moisture from the dryer media devices 62. Unless otherwise stated, the various embodiments of the air moving assembly 26 may share similar features, material, elements, and functionalities.

Figure 10:
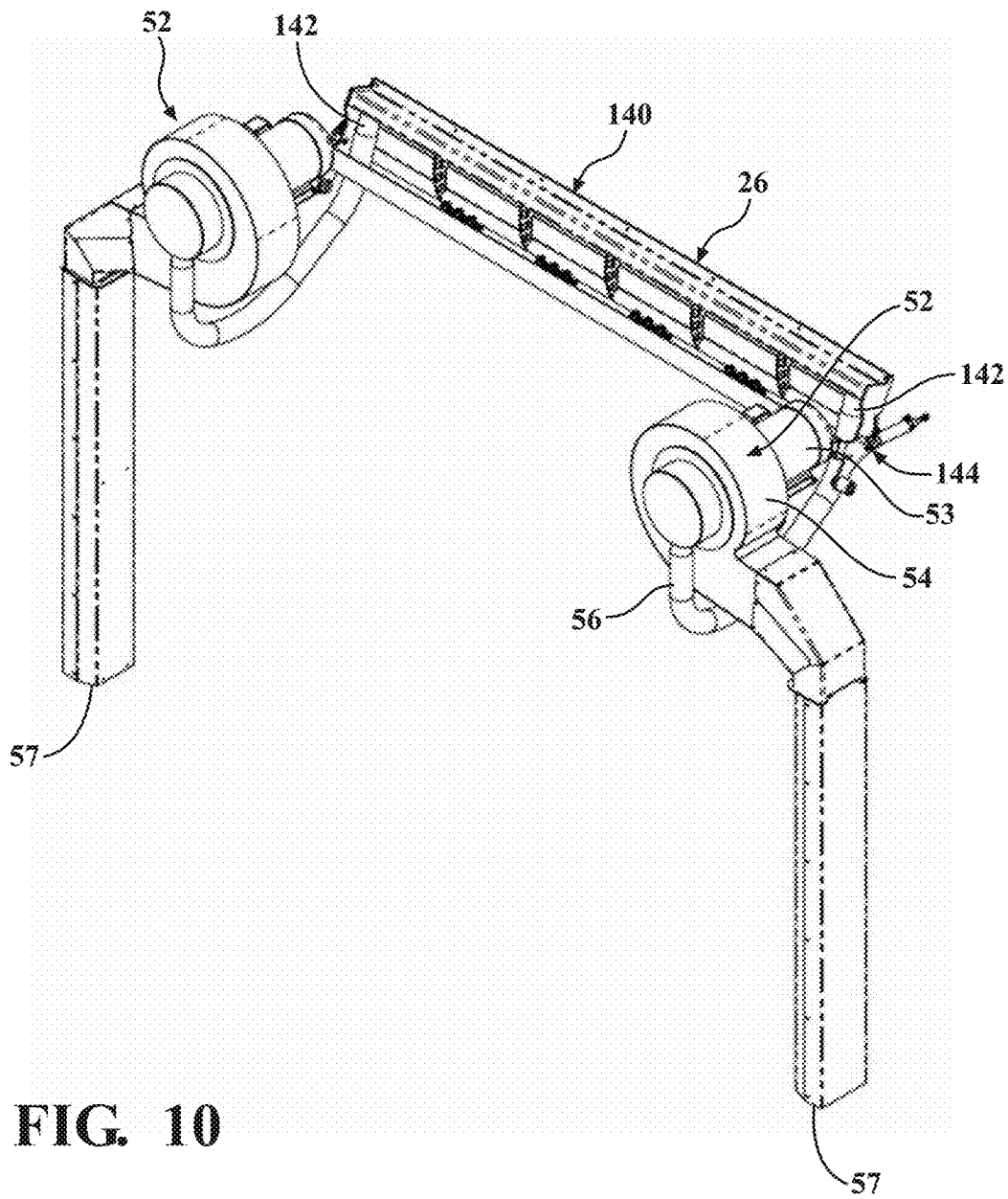
FIG. 10 is a rear perspective view of a first example embodiment of an air moving assembly of the drying assembly.

The air moving assembly 26 may include a nozzle manifold 140 extending between opposite ends that each face one of the arms 72. The nozzle manifold 140 is positioned near the top dryer media device 62, and as will be discussed in greater detail below, at least one of the nozzle manifold 140 and top dryer media device 62 may be moveable relative to one another. As illustrated in FIG. 10, the nozzle manifold 140 may include at least one air connection 142 for connecting to one or more air generating devices 52, like the previously described blower assembly 52. As an example, the air flow generating devices 52 may include one or more vacuum pumps or blowers that may operate independently or in unison to share airflow. The generating device 52 may be configured to generate a strong outward airflow, a strong inward airflow (i.e., a vacuum), or a combination thereof through one or more apertures 160, 160' 160" on the nozzle manifold 140 for effectuating the removal of moisture from the dryer media device 22, such as dryer brush 62. In some embodiments, the generating device 52 may be configured to heat air in an outward air flow. In some embodiments, the nozzle manifold 140 may include a pair of air connections 142 located on the opposite ends of the nozzle manifold 140. In some embodiments, the pair of air connections 142 are in fluid communication with one another via the nozzle manifold 140. In some embodiments, the pair of air connections 142 are in fluid communication with discrete paths that do not intersect. In some embodiments, each of the air connections 142 is connected to a different generating device 52 operating independently or in unison sharing airflow. It should be appreciated that in some embodiments, characteristics of the airflow are selected to remove moisture from, but not completely dry the dryer media device 22. This can be desirable because in certain cases drying media work best when there is an optimal level of moisture on it.

Figure 15:
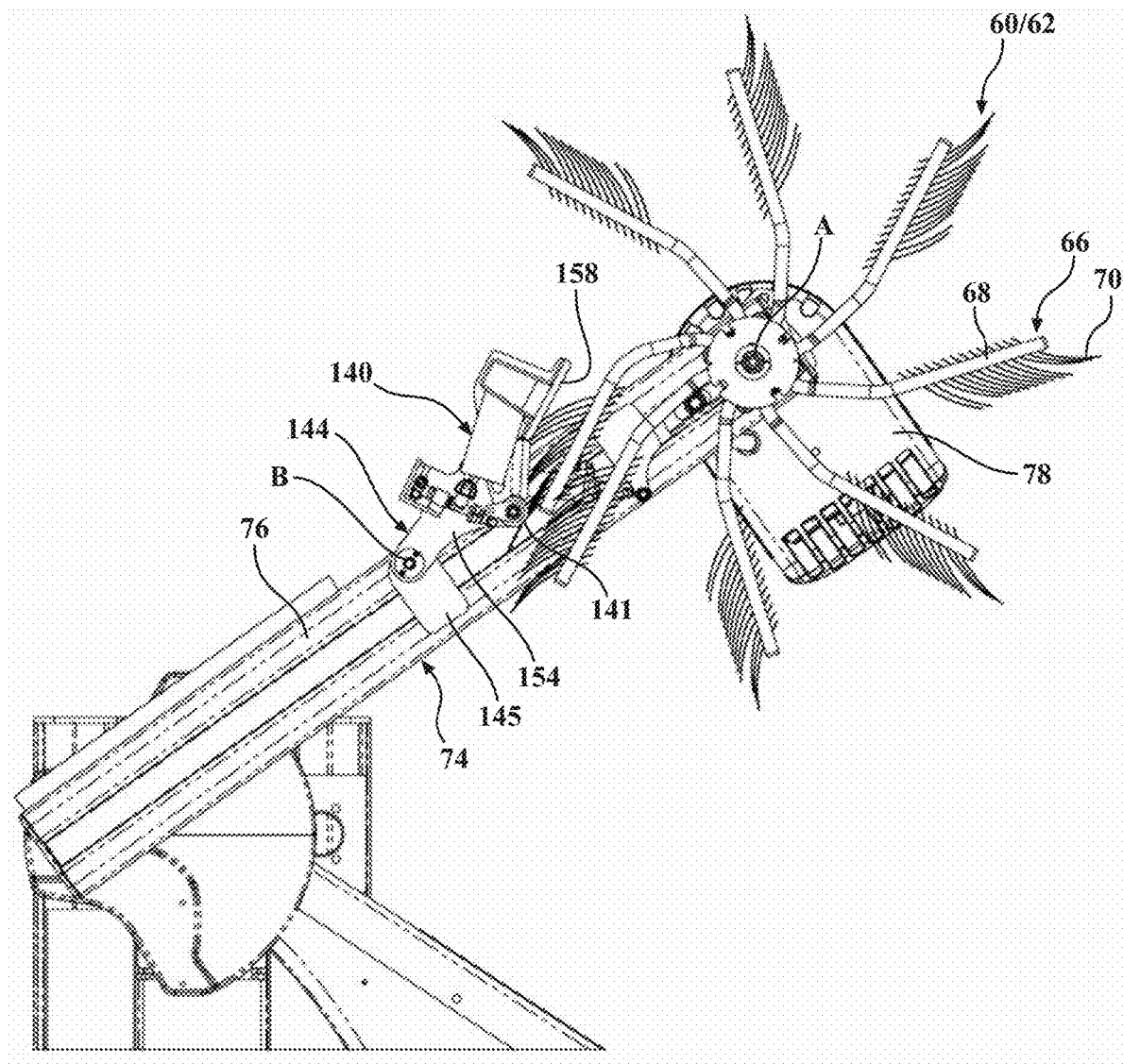
FIG. 15 is a side view of the first example embodiment of the air moving assembly, illustrating the air moving assembly in a first contact position with the dryer media devices.
Figure 16:
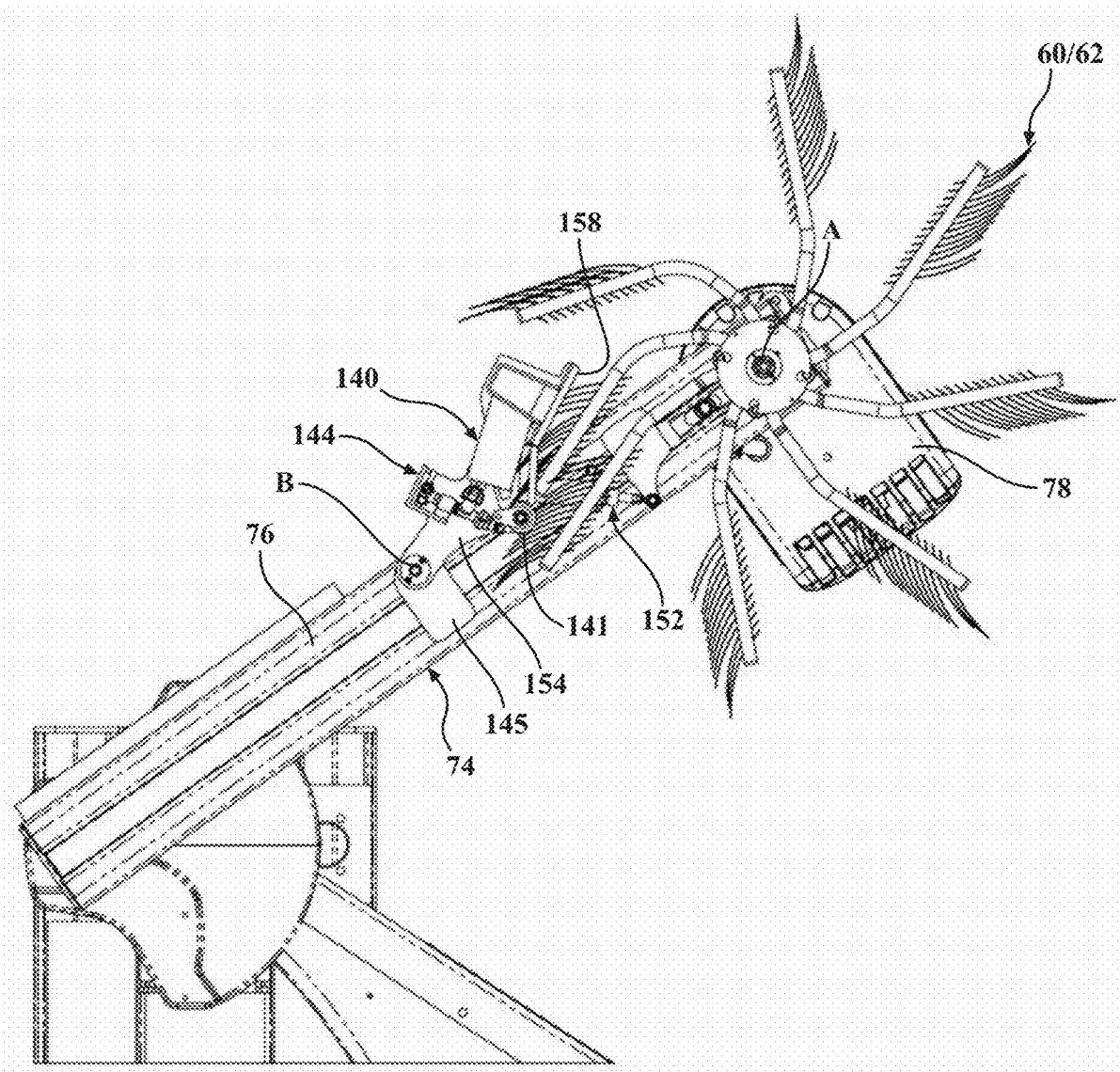
FIG. 16 is a side view of the first example embodiment of the air moving assembly, illustrating the air moving assembly in a second contact position with the dryer media devices.
Figure 17:
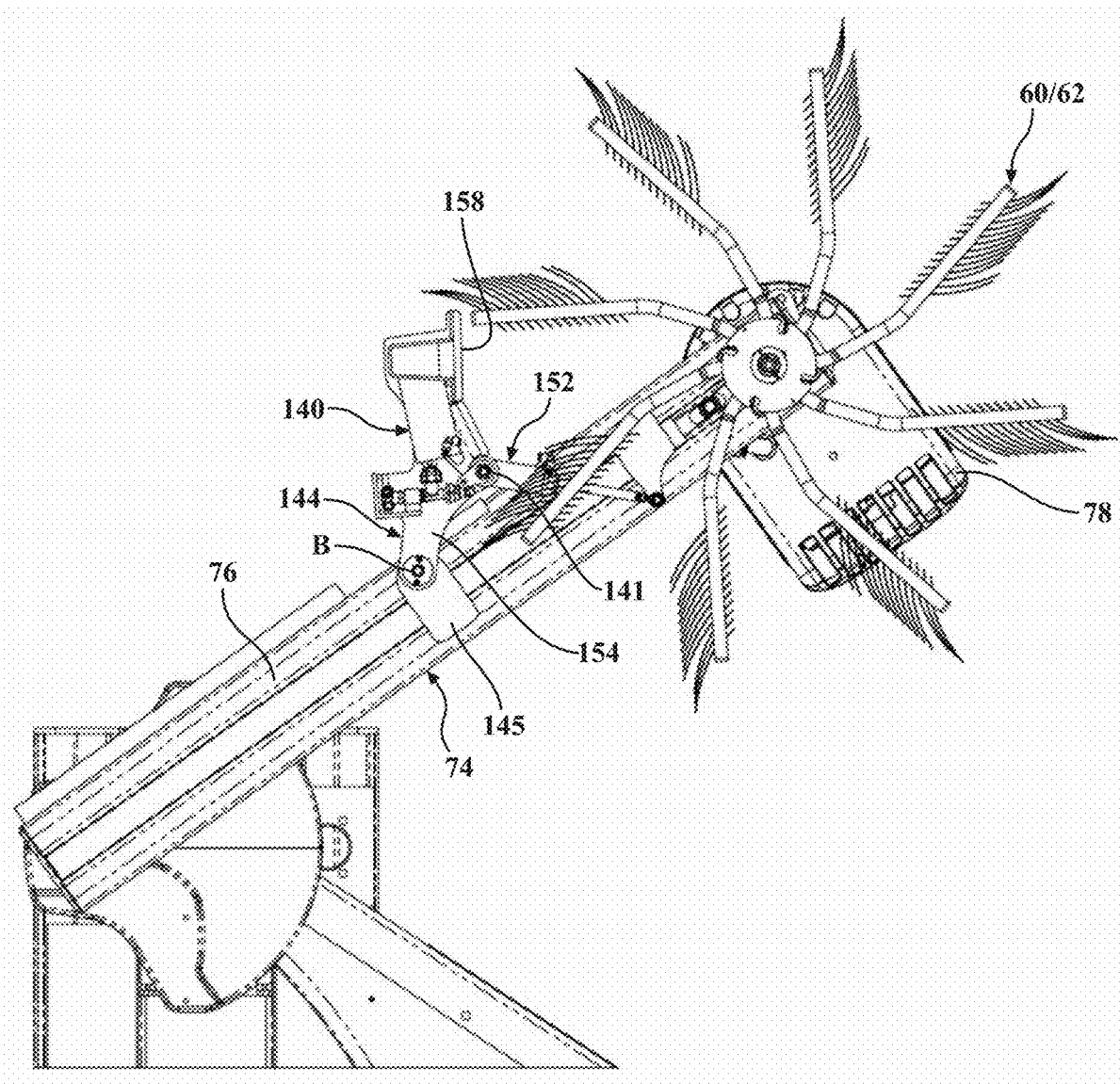
FIG. 17 is a side view of the first example embodiment of the air moving assembly, illustrating the air moving assembly in a spaced position from the dryer media devices.

FIGS. 15-17 illustrate different operational positions of the air moving assembly 26. More particularly, FIG. 17 shows the air moving assembly in a non-operational position where it is spaced from the dryer media device 62 and thus provides a minimal amount of drying to the dryer media device 62. While the air moving assembly 26 is in this position, the dryer media device is able to dry the vehicle unencumbered by the air moving assembly 26. FIGS. 15 and 16 illustrate the air moving assembly in an operational position where the nozzle manifold 140 is engaged by the dryer media device 62 during rotation of the dryer media device 62, thus allowing the air moving assembly to dry media elements 66 of the dryer media device 62.

The air moving assembly 26 may connect to various portions of the drying assembly 22, such as the frame 32, the vertical portions 36, the crossbeam 38, the arms 76, the counterweight devices, or a combination thereof. According to the example embodiment, the air moving assembly 26 is connected to the arms 76.

More particularly, as best shown in FIG. 15-17, the air moving assembly 26 may include a pair of brackets 144 located at each end of the nozzle manifold 140. The nozzle brackets 144 are pivotally connected to the arms 76 such that they are configured to move with the arms 76 while also being pivotable relative to the arms 76. More particularly, each of the brackets 144 includes a side plate 145 that is connected to one of the arms 76. Each of the nozzle brackets 144 further includes a manifold bracket 154 along edges of the nozzle manifold 140. The manifold bracket 154 is pivotally connected to the side plate 145 along a pivot axis B. Pivoting movement of the nozzle manifold 140 with respect to the arms 76 may be effectuated by at least one nozzle adjustment actuator 152. The nozzle adjustment actuator 152 may extend between the manifold bracket 154 and a connection point along the arm 76. The nozzle adjustment actuator 152 may be pivotally connected to the manifold bracket 154 and also pivotally connected to arm 76. The nozzle adjustment actuator 152 may be a linear-type actuator such as a lead screw, rack and pinion, piston, or combinations thereof. In some embodiments, the nozzle adjustment actuator 152 may include a pneumatic piston or a hydraulic piston. The nozzle adjustment actuator 152 is moveable between a shortened position in which the nozzle manifold 140 is pivoted toward the top dryer media device 62 in the operational position (e.g., FIGS. 15 and 16), and an extended position in which the nozzle manifold 140 is spaced from the top dryer media device 62 in the non-operational position (e.g., FIG. 17). Again, while in the extended/non-operational position, the top dryer media device provides a minimal amount of drying to the dryer media device 62 but still permits the top dryer media device 62 to treat vehicle unencumbered by the nozzle manifold 140.

As illustrated in FIG. 14, the nozzle manifold 140 includes a face 158 that is oriented to face the top dryer media devices 62. The face 158 defines at least one nozzle aperture 160 for transferring drying fluids from the air generating device 52 therethrough. According to the example embodiments, the face 158 includes a plurality of nozzle apertures 160 that are linearly aligned with one another along a length of the face 158. As will be discussed in further detail below, the apertures 160 could be positioned in other arrangements depending on specific needs.

As previously noted, the nozzle adjustment actuator 152 may move the nozzle manifold 140 between the operational position (e.g., FIGS. 15-16) wherein the face 158 of the nozzle manifold 140 engages, or is closely spaced (e.g., with 5 inches, within 3 inches, within 1 inch, within ½ inch, within 1/16 inch) from the top dryer media device 62 and a stowed position (e.g., FIG. 17) wherein the nozzle manifold 140 is spaced from the top dryer media device 62. It should be appreciated that while the nozzle manifold 140 is in the operational position, a large surface area of the media elements 60 passes over the apertures 160 for effectuating the removal of excess moisture from the media elements 60. On the other hand, it should be appreciated that employing the non-operational position in some circumstances, such as when the media elements 60 are not saturated, can extend the life of the media elements 60 by not exposing them to undue contact.

In some embodiments, the face 158 has an arc-shape (e.g., FIGS. 25A-25B) or angled surface (e.g., FIG. 15) such that the face 158 partially surrounds the brush 62 at a similar radius of curvature as the working circumference C of the brush 62. It should be appreciated that in the case of an angled face 158 like in FIG. 15, the face 158 could be comprised of any number of angled segments to provide an approximately curved surface. The angled segments may each be substantially flat/planar. During use, the brush 62 passes across the apertures 160 to effectuate removal of excess moisture from the brush 62, and then the face 158 radially expands to a larger surface away and eventually no longer contacts the face 158. This provides an efficient surface for drying the brush 62 and leads to reduced wear on the brush 62 because it minimizes impacts of the brush 62 against the manifold 140. In some embodiments, the nozzle manifold 140 is formed of a polymer, aluminum, material that is fiber reinforced, or any other suitable material.

As best shown in FIG. 14, a cylindrical-shaped roller 141 extends along a length of the nozzle manifold 140 along a roller axis C extending parallel to the hub axis. As illustrated, during rotation of the dryer media device 62, a leading edge of each of the media elements 66 contacts the roller 141 prior to contacting the nozzle manifold 140. The arrangement of the roller 141 and curved/angled nozzle manifold 140 prevent a "beater bar" effect from causing wear on the media elements 66. Specifically, the roller 141 and curved or angled shape of the face of the manifold 140 reduce an impact effect when the media elements 66 contact the nozzle manifold 140 region, and ease the media elements 66 into contact with the region of the drying apertures 160, thus providing a smooth, efficient surface upon which the media elements 66 contact during drying thereof. Indeed, these components reduce the number of times that the media elements 66 impact a feature, and minimize the severity of contact during such impacts.

Figure 24:
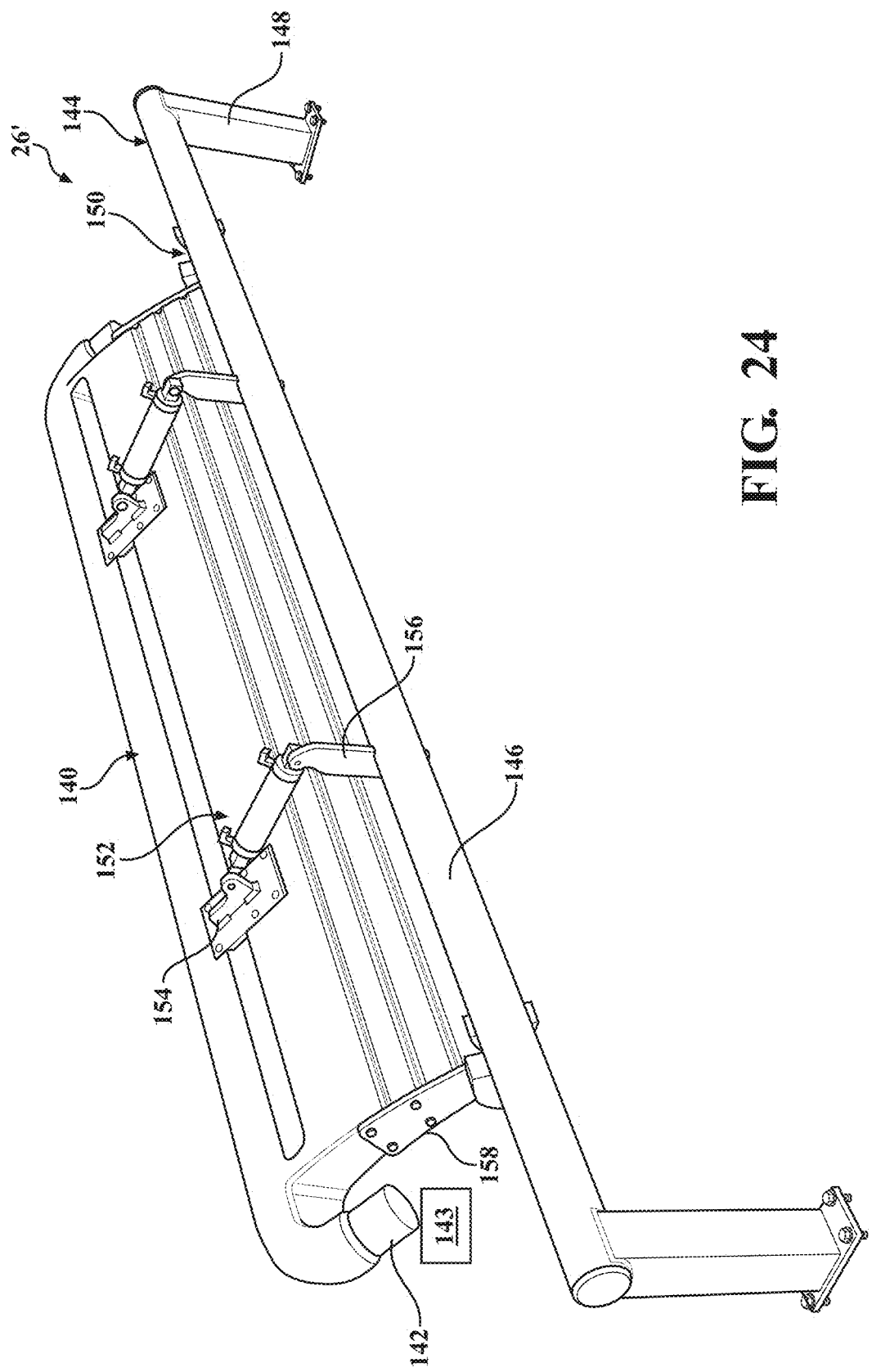
FIG. 24 is a perspective view of a first alternate embodiment of an air moving assembly.
Figure 25B:
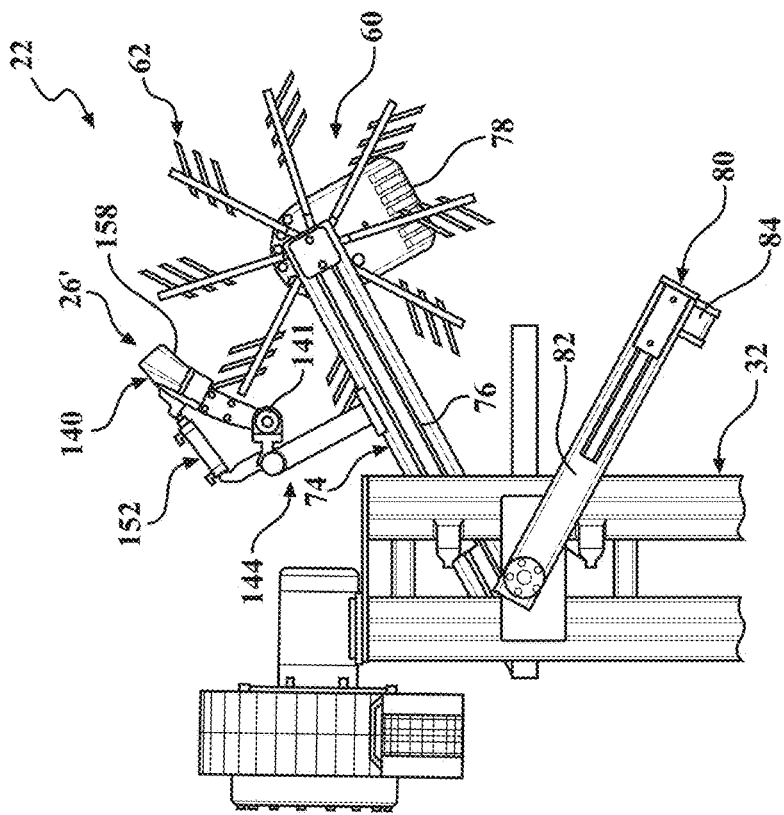
FIGS. 25A and 25B are side views of the first alternate embodiment of the air moving assembly, illustrating an arm in different positions.
Figure 25A:
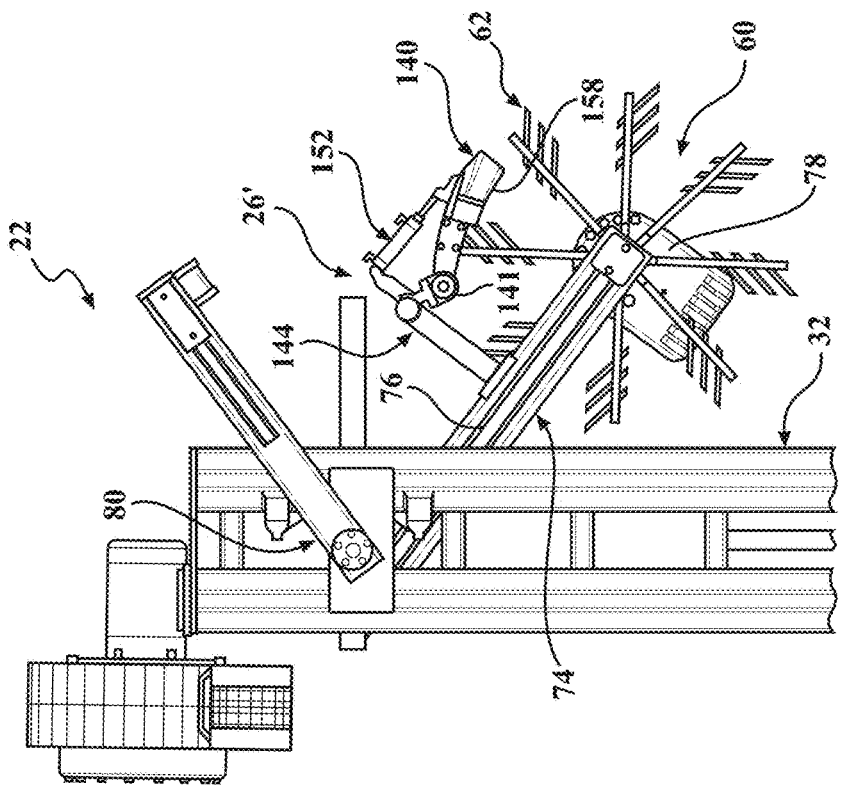

FIGS. 24-25B present a first alternate embodiment of the air moving assembly 26'. The air moving assembly 26' includes a nozzle bracket 144 that includes a horizontal support 146 extending between opposite ends and a pair of vertical supports 148 connected on opposite ends. The vertical supports 148 space the horizontal support 146 from the top dryer media devices 62. In some embodiments, the vertical supports 148 connect to each of the arms 76. In some embodiments, the nozzle manifold 140 is pivotally connected to the horizontal support 146 via at least one pivot connection 150, which may include a first pivot portion connected to the nozzle manifold 140 and a second pivot portion connected to the horizontal support 146 and a pivot pin connecting the first pivot portion and the second pivot portion. Movement of the nozzle manifold 140 with respect to the horizontal support 146 may be effectuated by at least one nozzle adjustment actuator 152. The nozzle adjustment actuator 152 may extend between a manifold bracket 154 and a horizontal support bracket 156. The nozzle adjustment actuator 152 may be pivotally connected to the manifold bracket 154 and also pivotally connected to the horizontal support bracket 156. The nozzle adjustment actuator 152 may be a linear-type actuator such as a lead screw, rack and pinion, piston, or combinations thereof. In some embodiments, the nozzle adjustment actuator 152 may include a pneumatic piston or a hydraulic piston.

Figure 26:
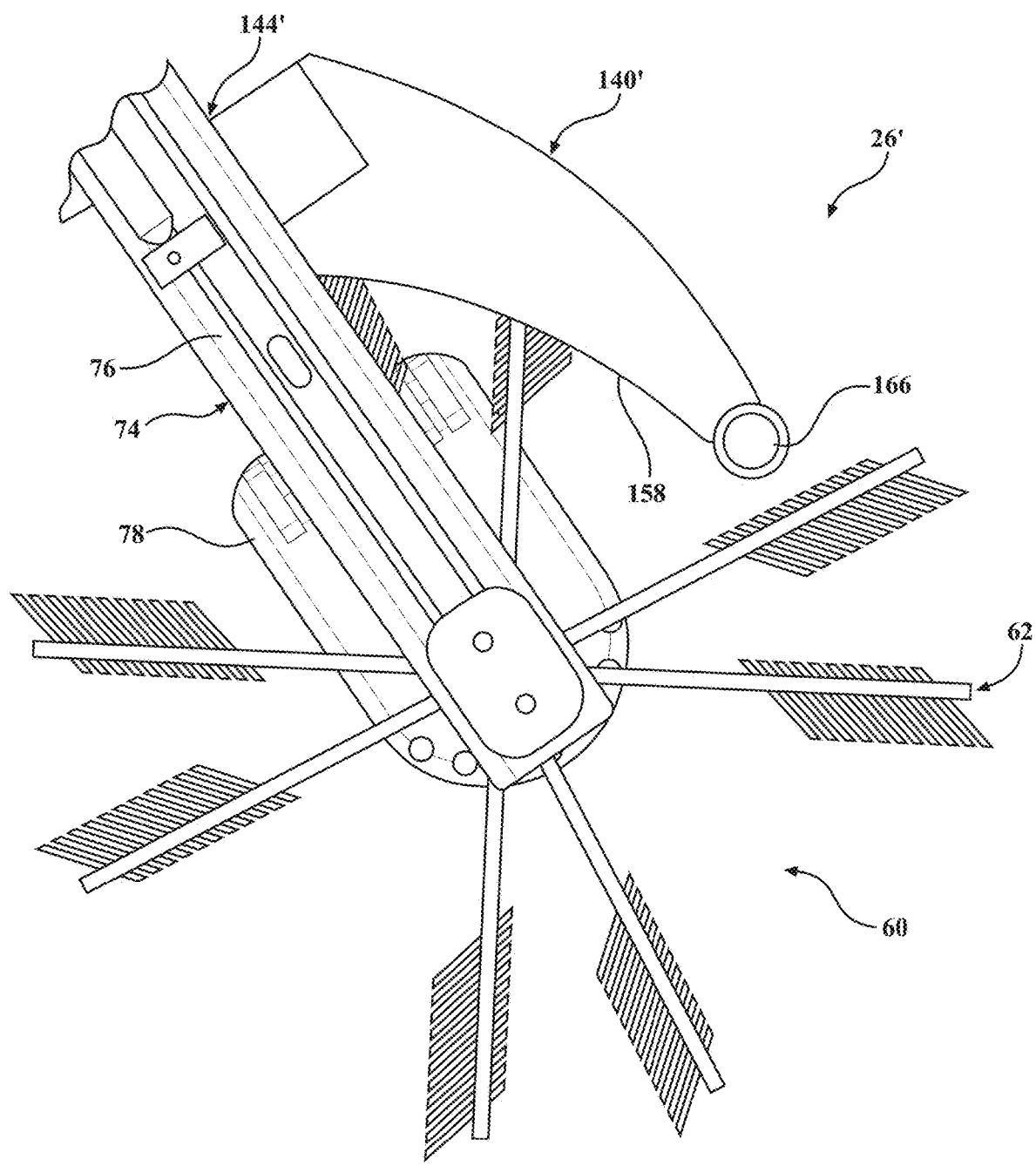
FIG. 26 is a side view of a second alternate embodiment of an air moving assembly.
Figure 27:
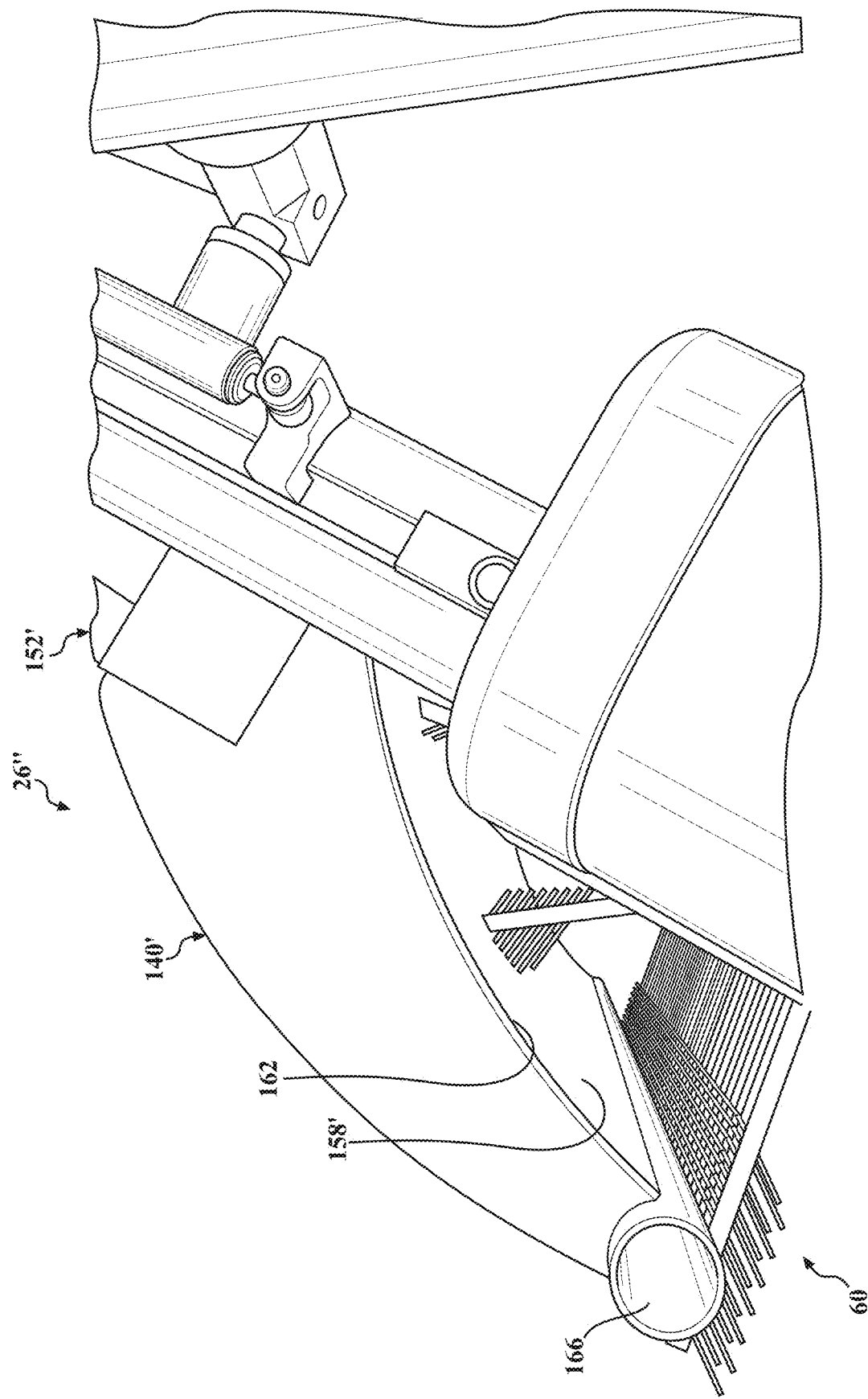
FIG. 27 is a magnified side view of the second alternate embodiment of the air moving assembly.

FIGS. 26-27 present a second alternative embodiment of the air moving assembly 26". The air moving assembly 26" may include a nozzle manifold 140' similar to the previously described embodiments, with minor differences. The air moving assembly 26" may be located on the arms with a nozzle bracket 144' that may be slideable with respect to the arms 76 with a nozzle adjustment actuator 152'. The nozzle adjustment actuator 152' may be configured as a linear-type actuator, such as a lead screw mechanism, a rack and pinion gear, a pneumatic piston actuator, a hydraulic operated piston actuator, other linear adjustment mechanisms or combinations thereof. The nozzle bracket 144' may be a carrier moveable within a slot (not shown) on the arms 76.

Figure 28C:
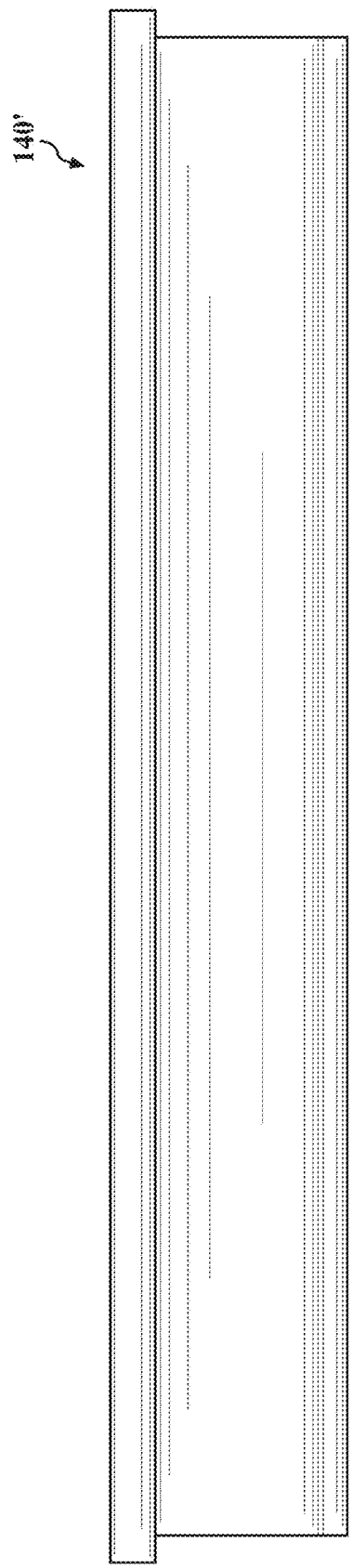
FIG. 28C is a top view of the nozzle manifold of the second alternate embodiment of the air moving assembly.
Figure 28D:
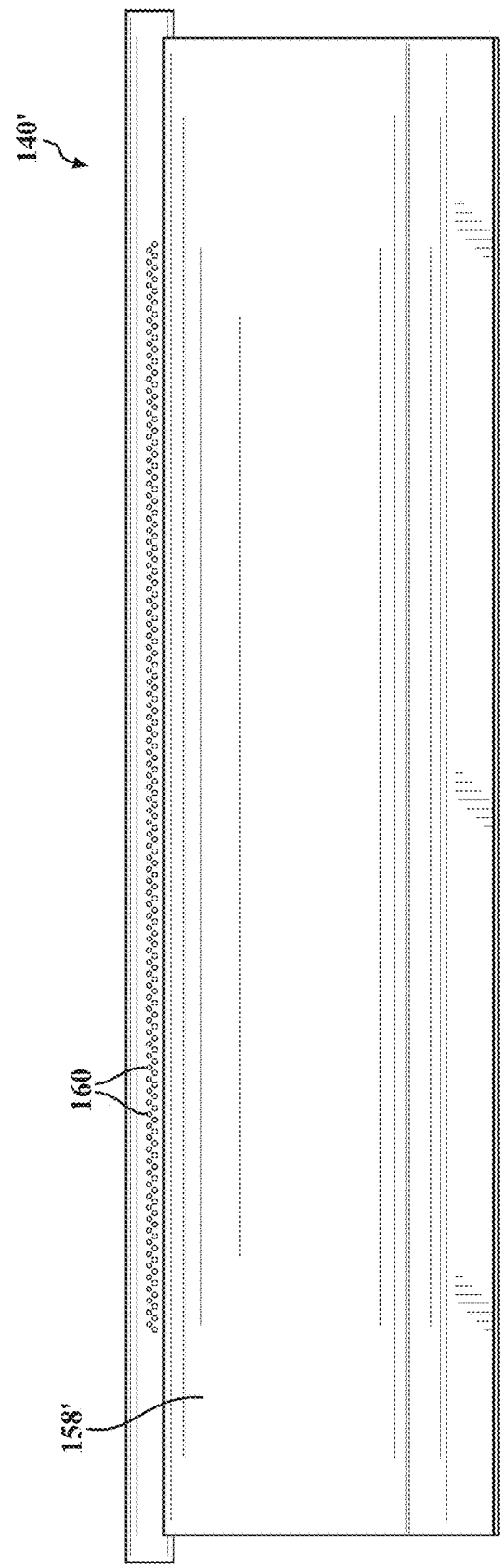
FIG. 28D is a bottom view of the nozzle manifold of the second alternate embodiment of the air moving assembly.
Figure 29:
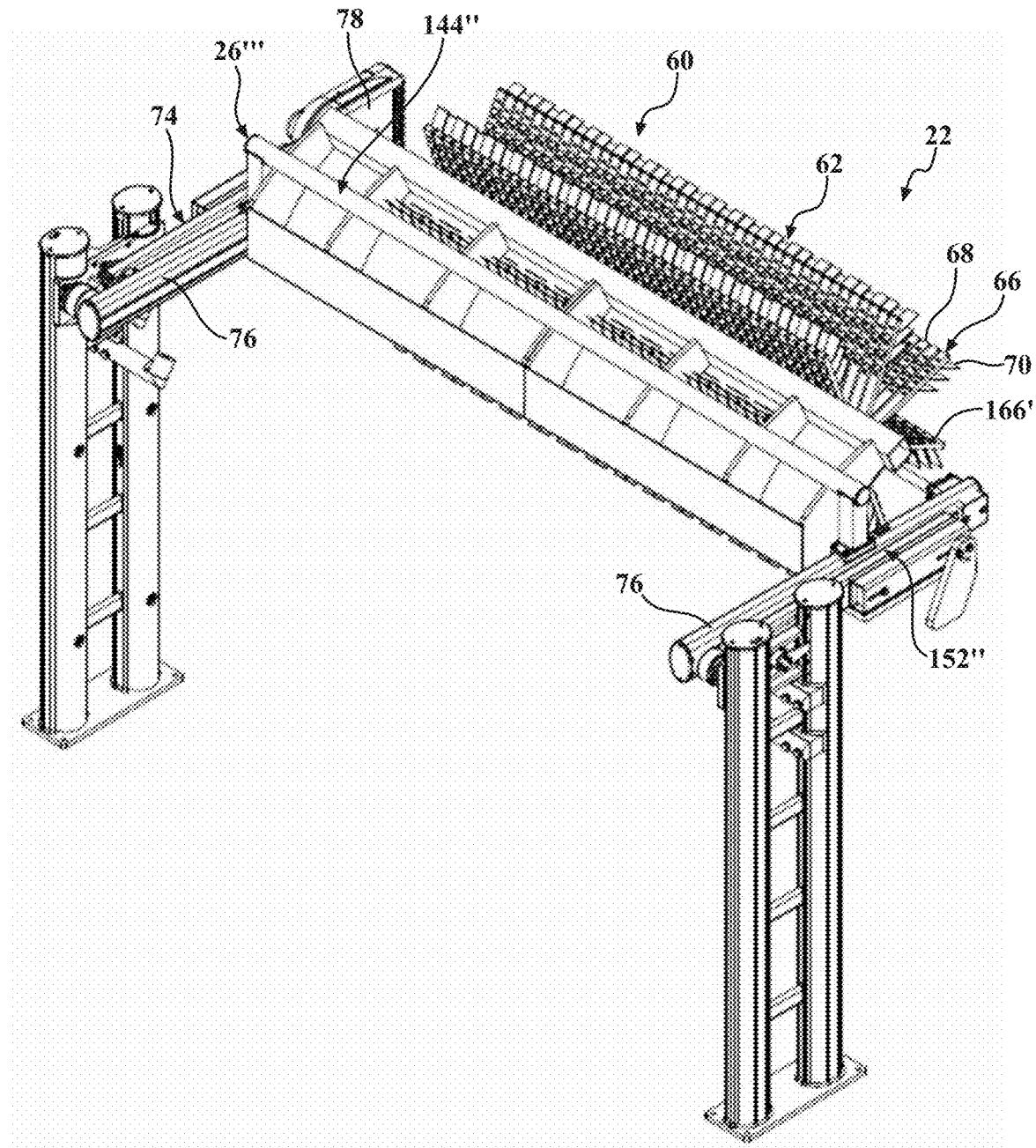
FIG. 29 is a perspective view of a third alternate embodiment of the air moving assembly.
Figure 30:
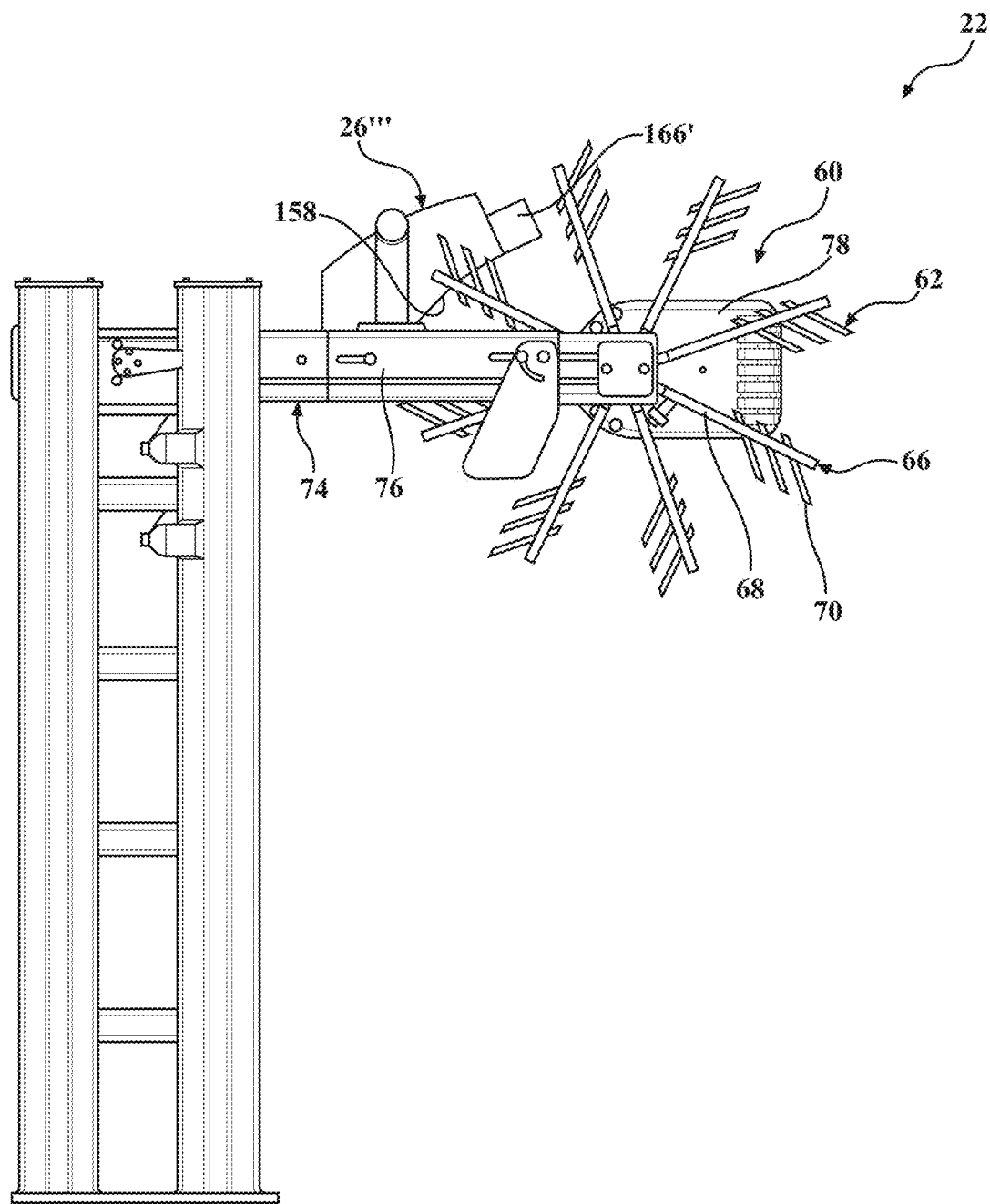
FIG. 30 is a side view of the third alternate embodiment of the air moving assembly.

FIG. 27 illustrates an example curved face 158' of the nozzle manifold 140'. In some embodiments, the nozzle manifold 140' may be continually in the operable position during usage of the top dryer media device 62 for continually drying the top dryer media device 62 simultaneously with drying the vehicle in-cycle. FIGS. 28A through 28D illustrate various views of the nozzle manifold 140'. FIG. 28A illustrates the nozzle manifold 140' from a perspective orientation, where a surface of the nozzle manifold 140' opposite the face 158' defines a series of supporting ribs 164. In some embodiments, the air connections 142' are aligned along a singular axis on opposite ends of a nozzle tube 166, which may include a circular-cross section and at least two of the nozzle apertures 160 may be oriented on transverse planes. FIG. 28B illustrates the nozzle manifold 140' from a side orientation. FIG. 28C illustrates the nozzle manifold 140' from a top orientation. FIG. 28D illustrates the nozzle manifold 140' from a bottom orientation that shows the face 158'.

Figure 31B:
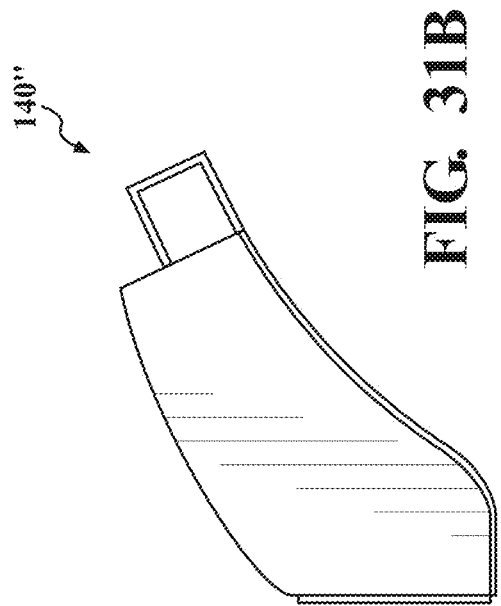
FIG. 31B a side view of the nozzle manifold of the third alternate embodiment of the air moving assembly.
Figure 31A:
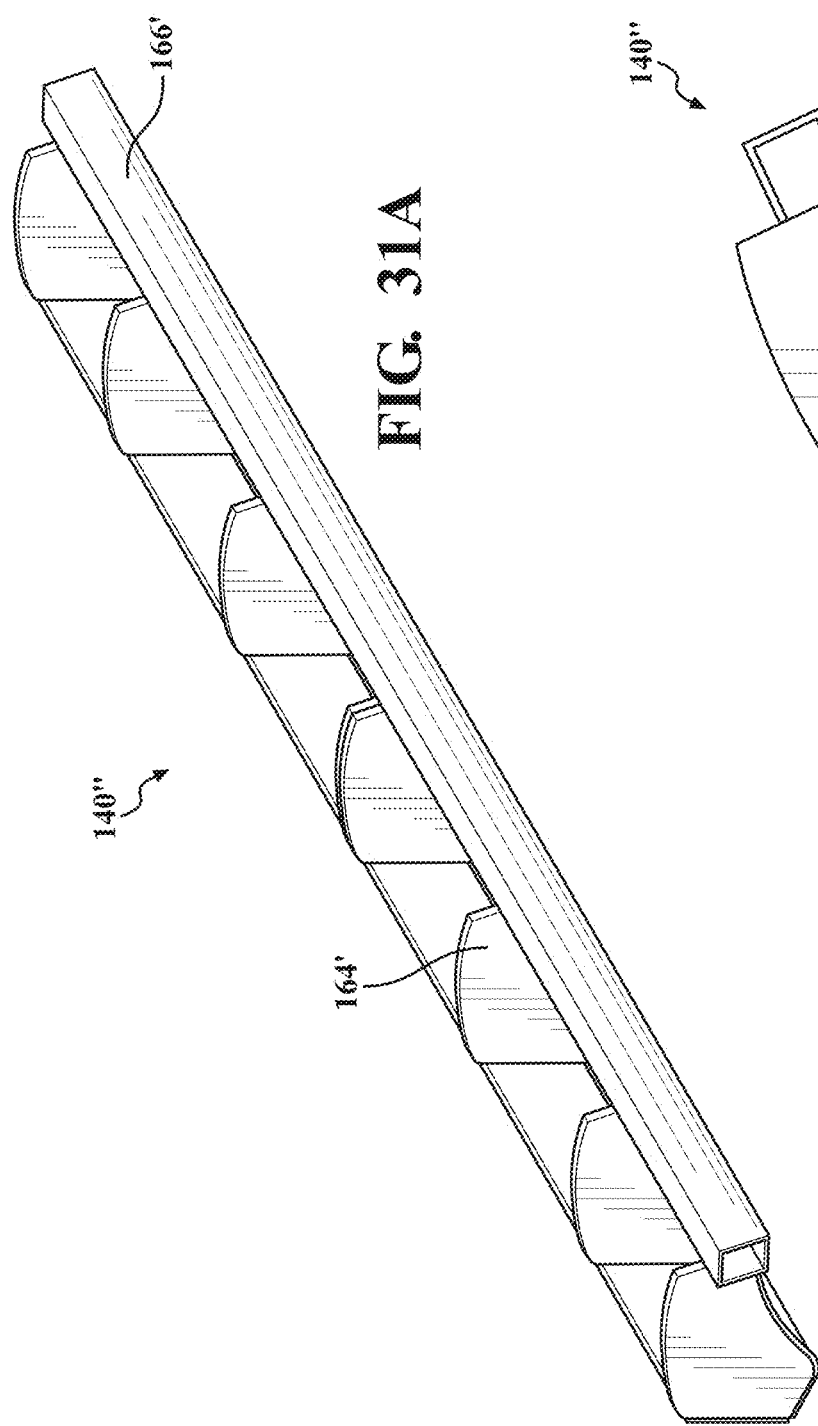
FIG. 31A is a perspective view of a nozzle manifold of the third alternate embodiment of the air moving assembly.
Figure 31C:
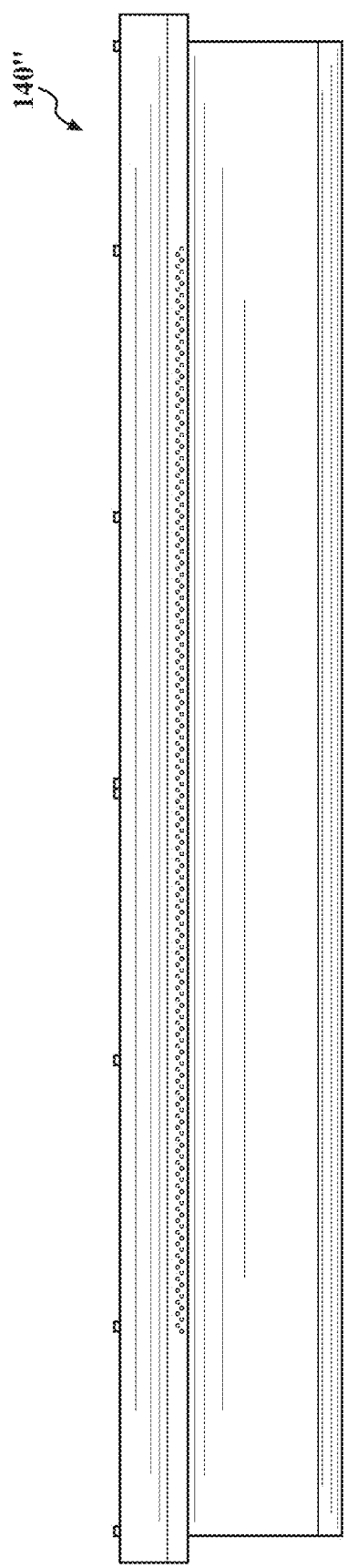
FIG. 31C is a top view of the nozzle manifold of the third alternate embodiment of the air moving assembly.
Figure 31D:
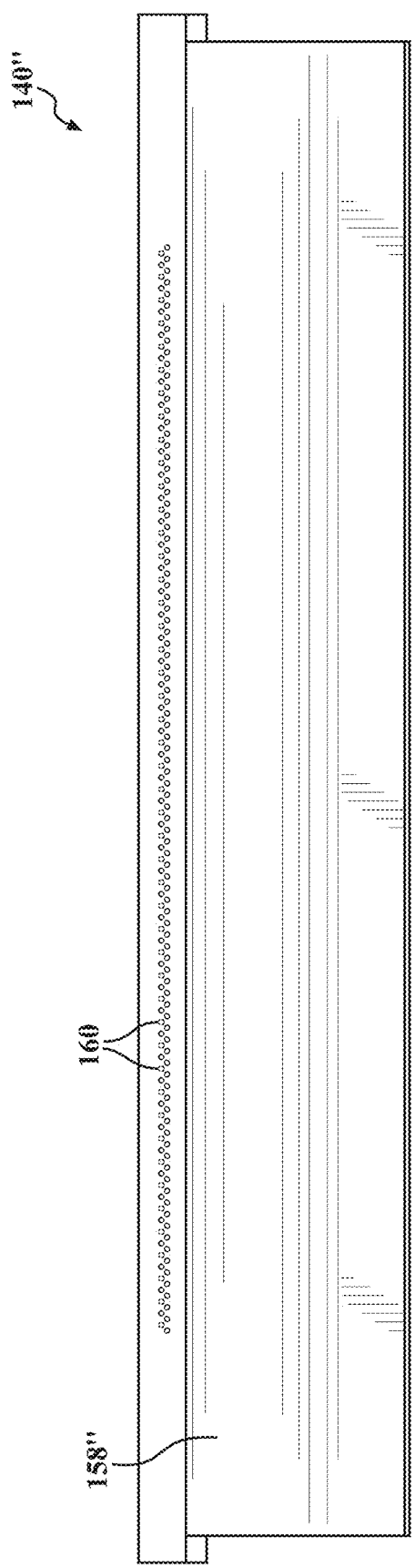
FIG. 31D is a bottom view of the nozzle manifold of the third alternate embodiment of the air moving assembly.

FIGS. 29-31D present a third alternate embodiment of an air moving assembly 26'''. The air moving assembly 26''' may include a nozzle manifold 140'' similar to the previous embodiments with minor difference. The nozzle manifold 140'' may include a nozzle tube 160' that may include a square or rectangular cross-section. The nozzle manifold 140'' may be secured to the arms 72 with a nozzle bracket 144''. The nozzle bracket 144'' may be moveable relative to the arms 72 via slideable movement via a nozzle adjustment actuator 152''. The nozzle adjustment actuator 152'' may be configured as a linear-type actuator, such as a lead screw mechanism, a rack and pinion gear, a pneumatic piston actuator, a hydraulic operated piston actuator, other linear adjustment mechanisms or combinations thereof. The nozzle bracket 144'' may be a carrier moveable within a slot (not shown) on the arms 76. FIGS. 31A through 31D illustrate various views of the nozzle manifold 140''. FIG. 31A illustrates the nozzle manifold 140'' from a perspective orientation, where a surface of the nozzle manifold 140'' opposite the face 158'' defines a series of supporting ribs 164'. In some embodiments, the air connections 142'' are aligned along a singular axis on opposite ends of a nozzle tube 166'. FIG. 31B illustrates the nozzle manifold 140'' from a side orientation. FIG. 31C illustrates the nozzle manifold 140'' from a top orientation. FIG. 31D illustrates the nozzle manifold 140'' from a bottom orientation that shows the face 158''. In some embodiments, nozzle apertures 160 are located on adjacent sides of the square or rectangular cross-section such that the nozzle apertures 160 are oriented on transverse planes.

Figure 32A:
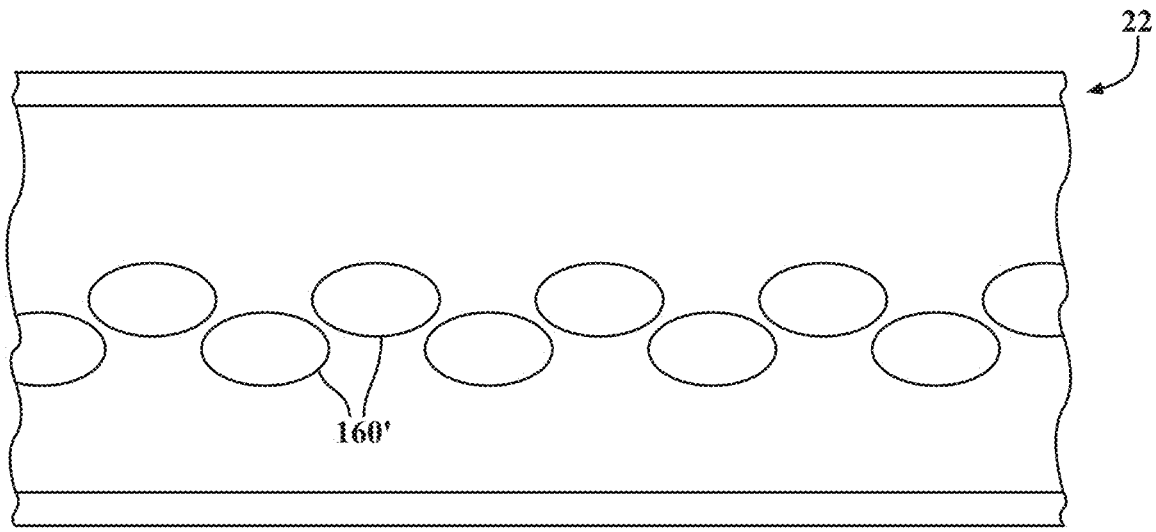
FIG. 32A is an enlarged view of nozzle apertures in accordance with a first embodiment.
Figure 32B:
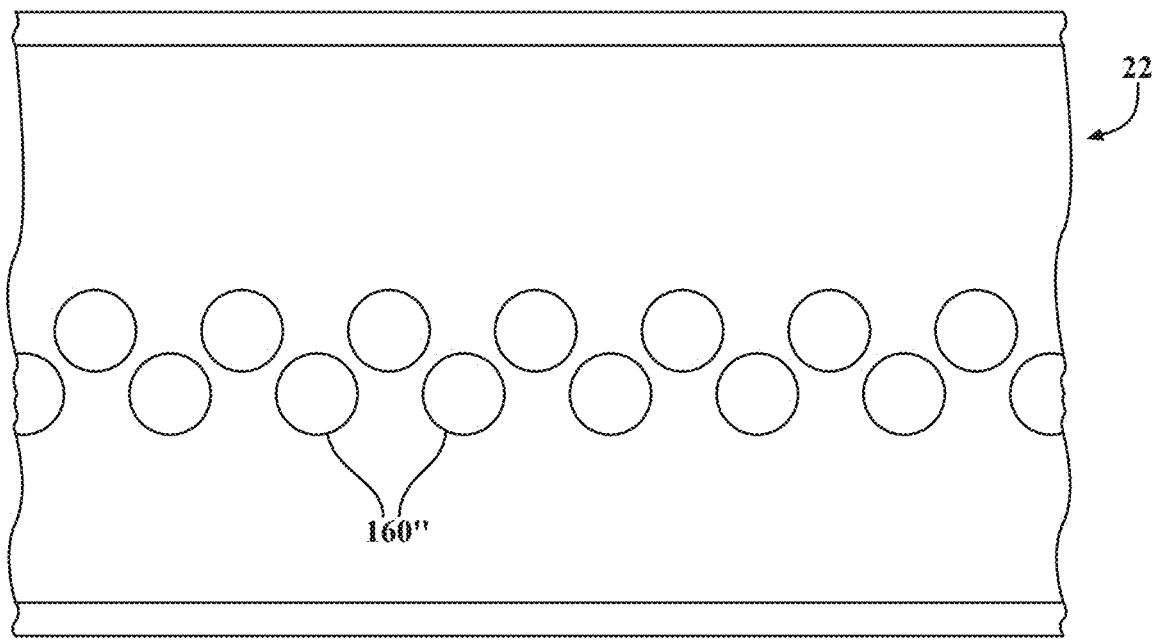
FIG. 32B is an enlarged view of the nozzle apertures in accordance with a second embodiment.

FIGS. 32A and 32B illustrate various embodiments of the nozzle apertures 160. FIG. 32A illustrates nozzle apertures 160' having an oblong shape, for example, an elliptical shape. FIG. 32B illustrates nozzle apertures 160'' having circular shapes. In some embodiments, the nozzle apertures 160 are disposed in two parallel lines in an alternating pattern. In some embodiments, the nozzle apertures 160 taper towards, and enlarge towards the face 158. In some embodiments, the nozzle apertures 160 taper away from, and shrink towards the face 158. In some embodiments, the nozzle apertures 160 are located in an alternating pattern on a curved or angled surface such that some of the nozzle apertures may be oriented on transverse planes, some of the nozzle apertures may be oriented on parallel planes, some of the nozzle apertures may be oriented on the same plane, or a combination thereof. It should be appreciated that many other shapes could be employed including, but not limited to, an arrow head and chevron shape, and different shaped openings may be employed for different applications, e.g., based on different drying materials. The apertures 160, 160', 160'' are optimized for certain applications such that water droplets on the media elements 160 move into the airstream, while also preventing the media elements 160 from getting stuck in the apertures 160, 160', 160'' to prevent tearing. Additionally, the chosen shapes of the apertures 160, 160', 160'' are selected with no sharp edges or points to further prevent tearing.

Figure 11:
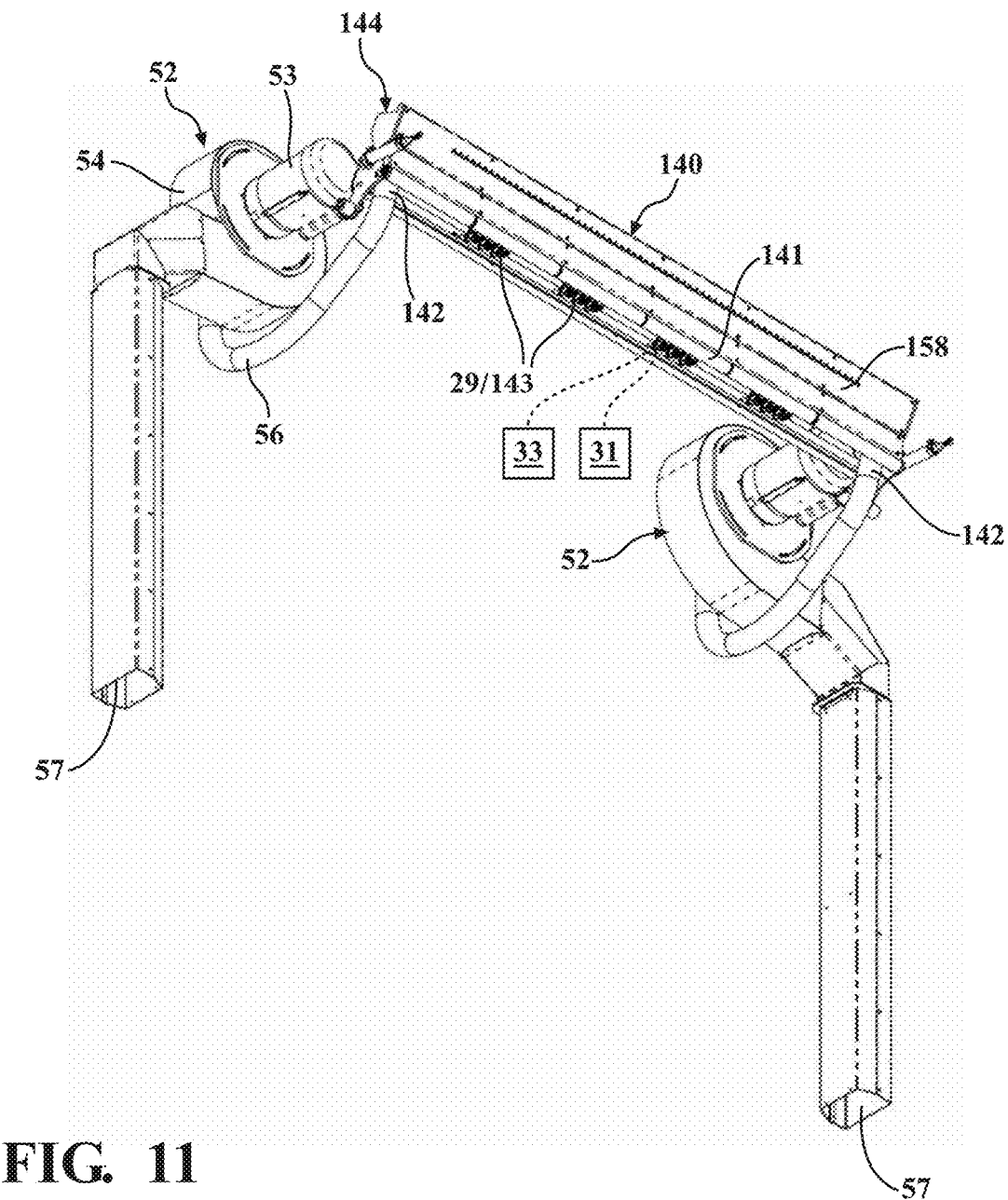
FIG. 11 is a front perspective view of the first example embodiment of the air moving assembly.
Figure 12:
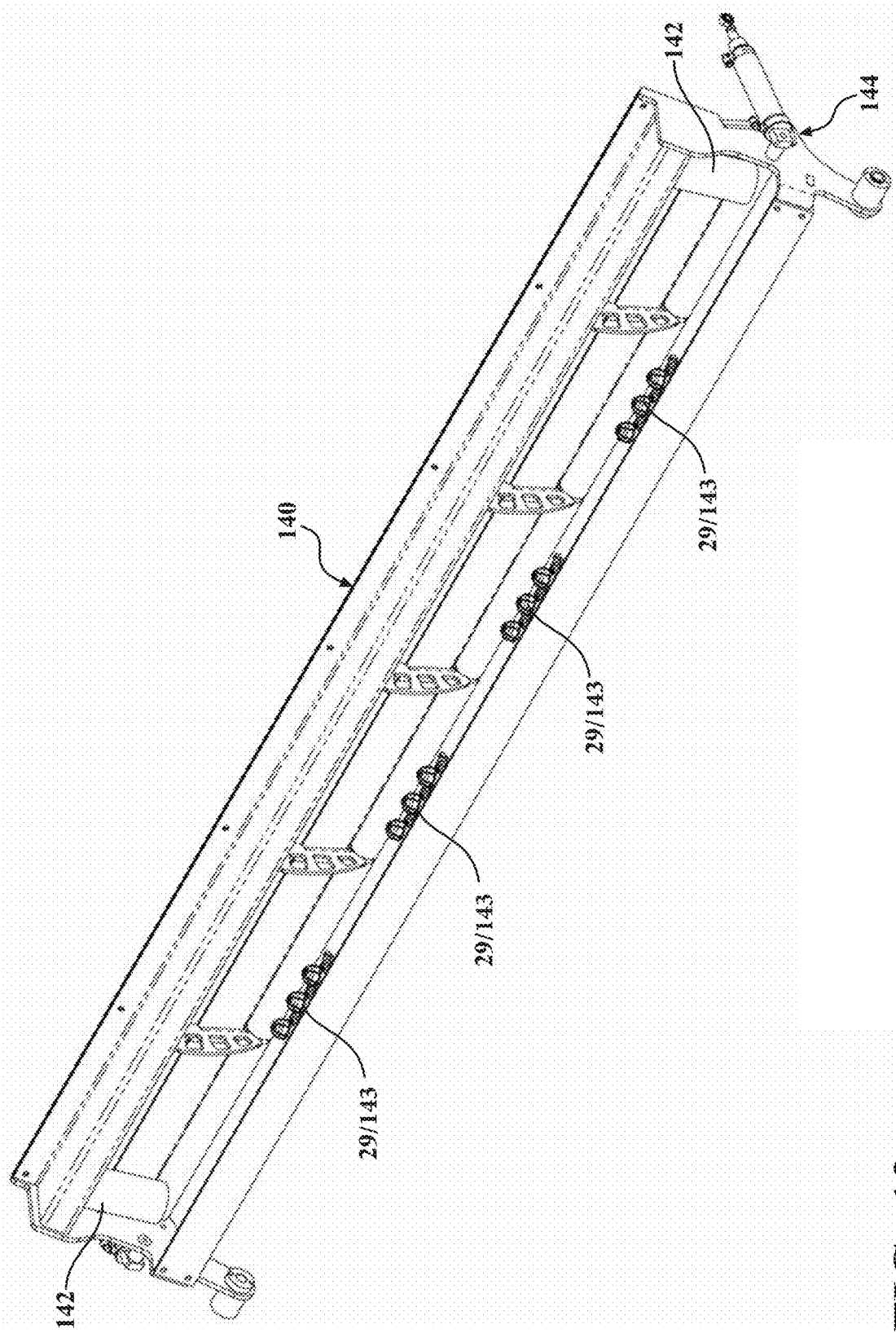
FIG. 12 is a rear perspective view of a nozzle manifold of the first example embodiment of the air moving assembly.
Figure 13:
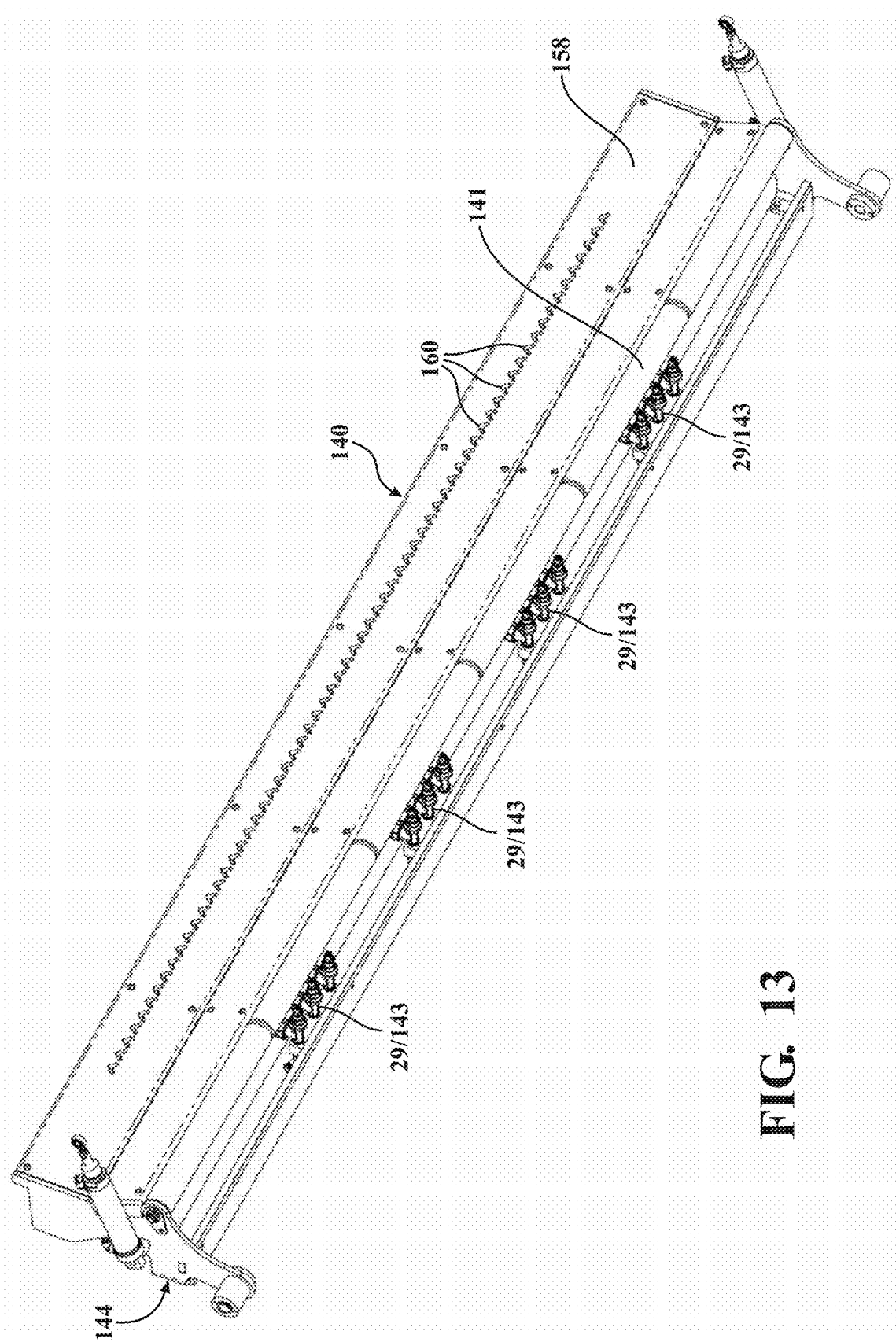
FIG. 13 is a front perspective view of the nozzle manifold of the first example embodiment of the air moving assembly.

As shown in the example embodiment of FIG. 11, one or more nozzles 29, 143 are distributed along a length of the nozzle manifold 140. The nozzles 29, 143 may include different types of nozzles 29, 143 for use in different applications. For example, the nozzles 29, 143 may include one or more cleaning nozzles 29 for cleaning the dryer media devices 24, such as the dryer media device 62. The cleaning nozzles 29 are part of the dryer media cleaning assembly 28. Alternatively, the nozzles 29, 143 may include one or more chemical applicator nozzles 143 for applying a chemical to the vehicle for enhancing an appearance of the vehicle after the vehicle has been treated by the washing assembly 20. As shown, the nozzles 29, 143 may be positioned in a plurality of groups that are spaced relative to one another along the length of the nozzle manifold 140.

In the case of the cleaning nozzles 29, they may be configured to apply a medium including, but not limited to, hot water, cold water, a chemical agent, or combinations thereof. As schematically illustrated in FIG. 11, the dryer media cleaning assembly 28 may be connected to a source 31 of such a medium. The medium source 31 may include a mixing/valving/pumping station, such as in a back room, which is configured to dilute the cleaning mixture into proper ratios, to provide pressure necessary to the spray nozzles, and a valve that is actuated by the control system at appropriate cleaning intervals. A plurality of cleaning nozzles 29 may be spaced relative to one another in such a manner that they spray a predetermined surface area of the dryer media element 62. For example, they cleaning nozzles 29 may be configured to spray a predetermined pattern than covers an entire surface area of the dryer media element 62.

In the case of the chemical applicator nozzles 142, they may be connected to a source of a chemical medium source 33. The chemical medium source 33 may provide various treatment chemicals including, but not limited to a detail spray and a wax.

It should be appreciated that the manifold may support any combination of cleaning nozzles 29 and chemical applicator nozzles 143 arranged in various patterns.

Figure 5:
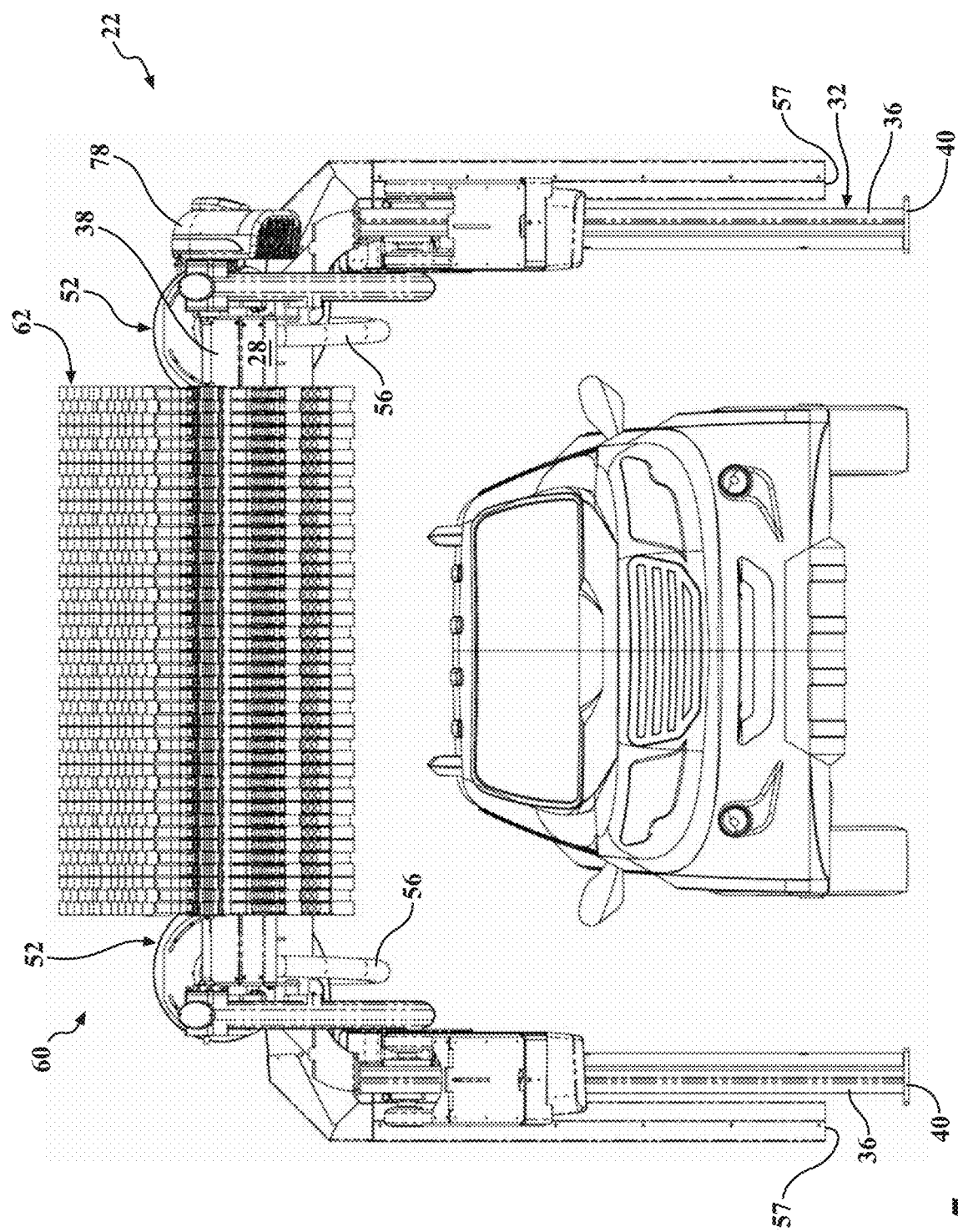
FIG. 5 is a rear view of the drying assembly.
Figure 6:
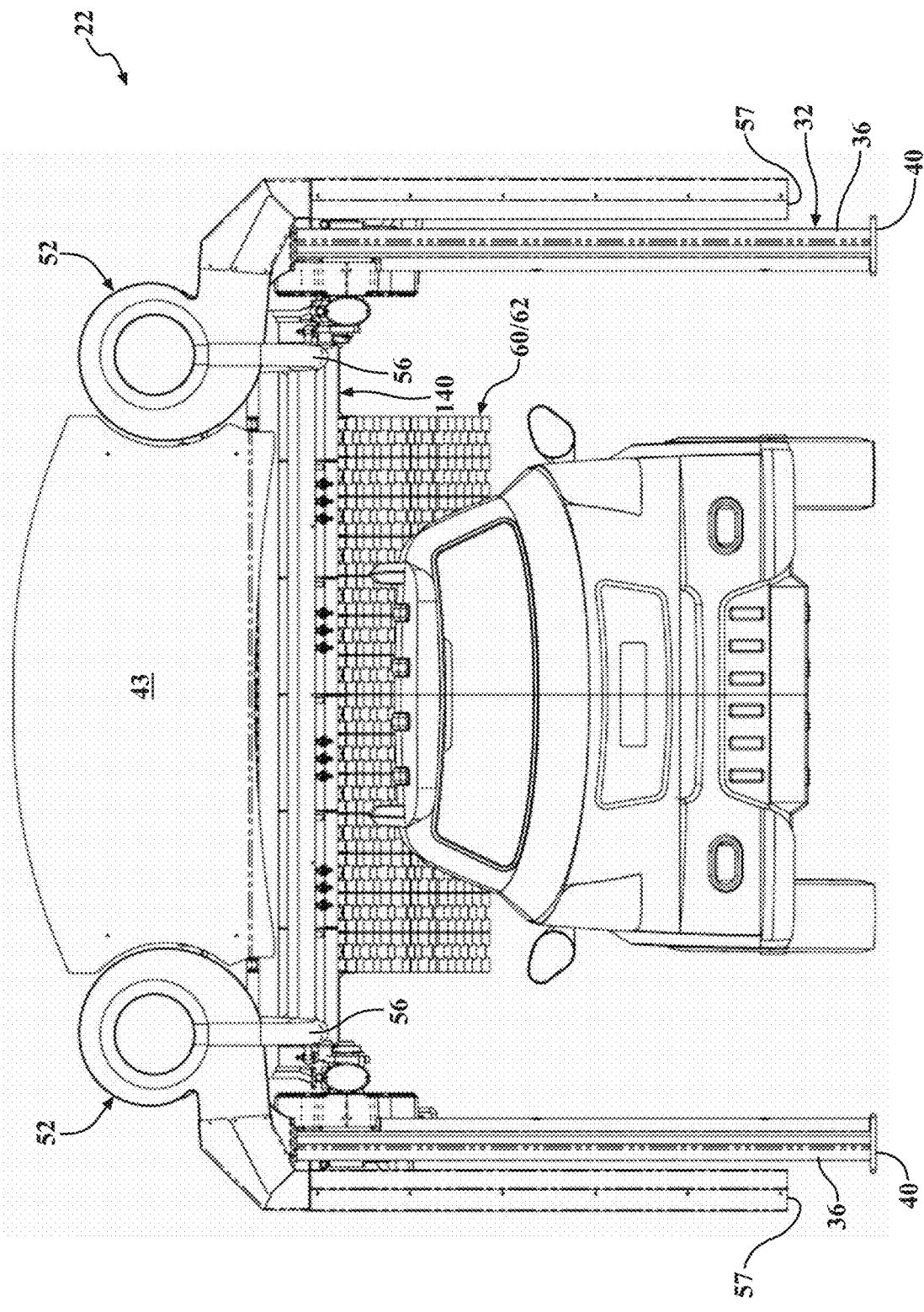
FIG. 6 is a front view of the drying assembly.
Figure 7:
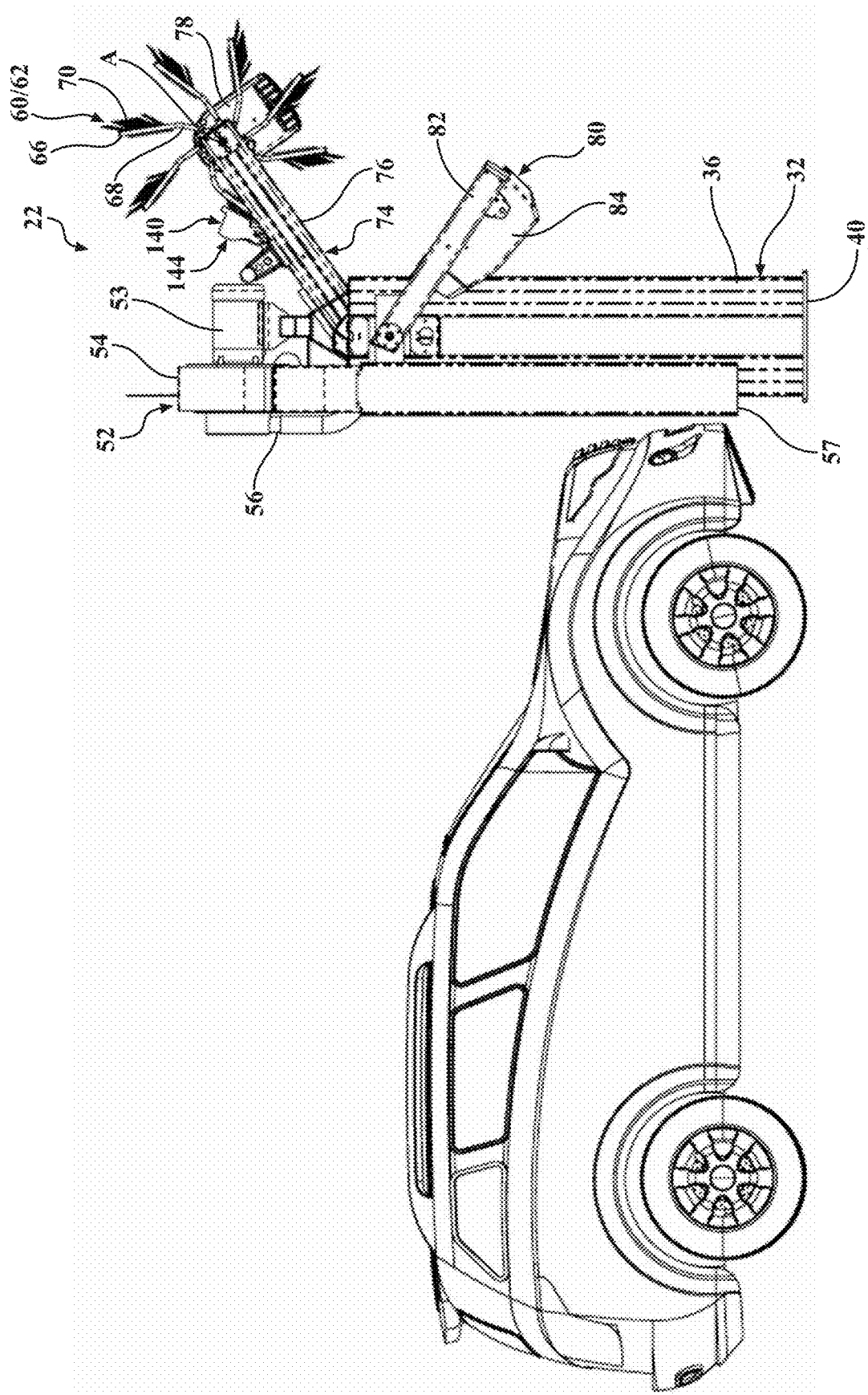
FIG. 7 is a right side view of the drying assembly, illustrating the vehicle approaching the drying assembly.
Figure 8:
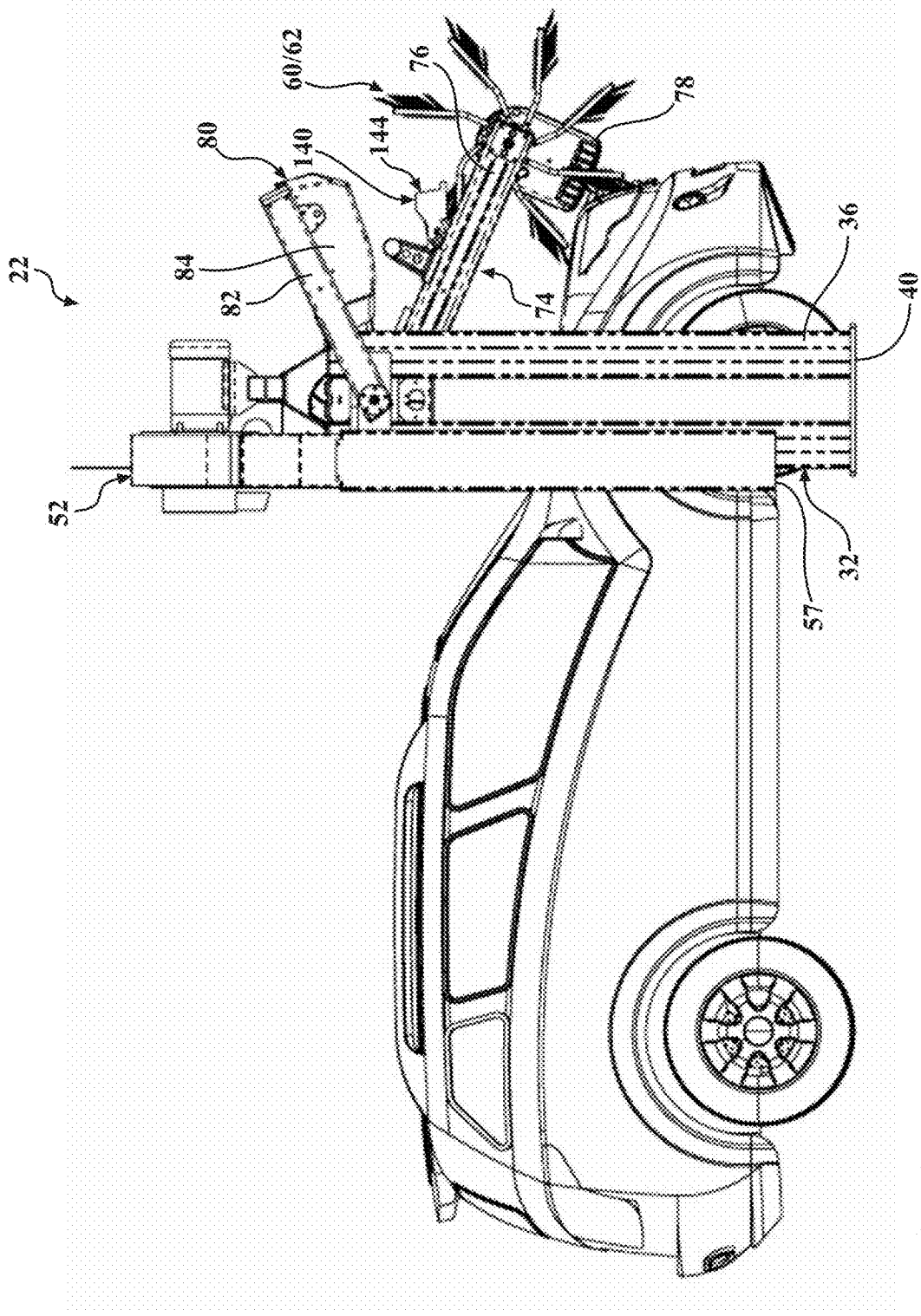
FIG. 8 is a right side view of the drying assembly, illustrating the vehicle in contact with the drying assembly while in a first position.
Figure 9:
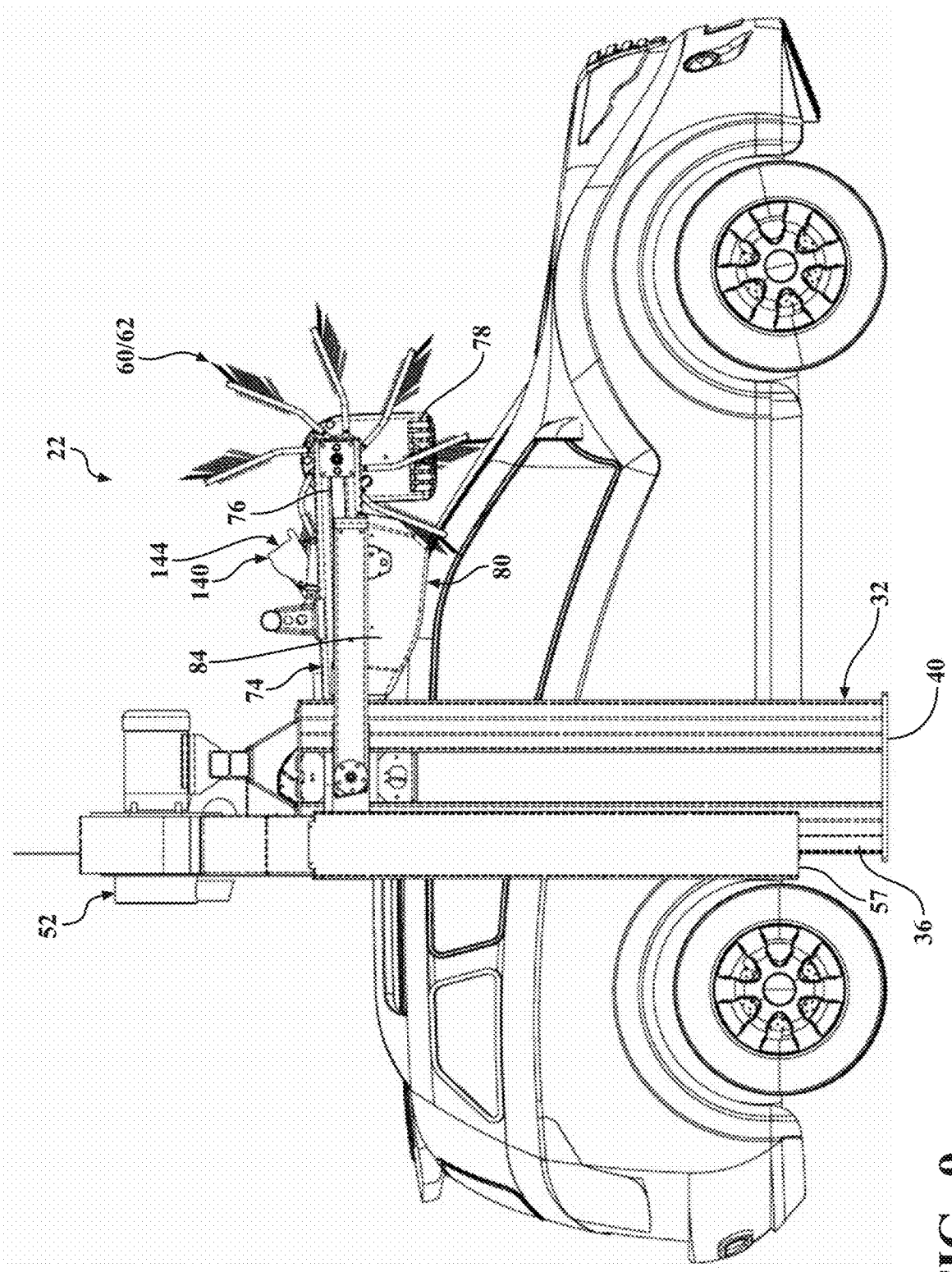
FIG. 9 is a right side view of the drying assembly, illustrating the vehicle in contact with the drying assembly while in a second position.

As best illustrated in FIG. 5, the nozzles 29, 143 may alternatively be located in various other positions on or adjacent to the drying assembly 22. For example, the nozzles 29, 143 may be located on the crossbeam 38, the vertical supports 36, the hub 64, or adjacent to the frame 32.

FIG. 33 generally illustrates a control system 300 according to the principles of the present disclosure. The control system 300 may include a controller 302 may include a processor 304 and a memory 306. The processor 304 may include any suitable processor, such as those described herein. Additionally, or alternatively, the controller 302 may include any suitable number of processors, in addition to or other than the processor 304. The memory 306 may comprise a single disk or a plurality of disks (e.g., hard drives), and includes a storage management module that manages one or more partitions within the memory 306. In some embodiments, memory 306 may include flash memory, semiconductor (solid state) memory or the like. The memory 306 may include Random Access Memory (RAM), a Read-Only Memory (ROM), or a combination thereof. The memory 306 may include instructions that, when executed by the processor 304, cause the processor 304 to, at least, perform the systems and methods described herein. A communications module 308 may communicate with the sensors, actuators, brushes, and other components of the vehicle wash system 10. The communication by include wireless communication, wired communication, pneumatic communication, hydraulic communication, fluid communication, or combinations thereof.

In some embodiments, the memory 306 may include software 310, which may be updateable via the communications module 308 in contact with a server 312. The memory 306 may further include cycle profile settings 314 corresponding to various washing services, vehicle profile settings 316 corresponding to different vehicle model geometries, temporary vehicle settings 318 corresponding to vehicle geometries sensed or detected from sensors 30, a maintenance data 320 corresponding to maintenance of the vehicle wash system 10. In some embodiments, the maintenance data 320 includes a predetermined timing, a predetermined number of cycles, and a sensed value from a sensor that generates an operational command via processor 304 to the air moving assembly 26. In some embodiments, the temporary vehicle settings 318 are erased from memory after a predetermined time or a predetermined number of cycles (e.g., one cycle).

In some embodiments, the system 300 and/or the controller 302 may perform the methods described herein. However, the methods described herein as performed by the system 300 and/or the controller 302 are not meant to be limiting, and any type of software executed on a controller or processor can perform the methods described herein without departing from the scope of this disclosure. For example, a controller, such as a processor executing software within a computing device, can perform the methods described herein.

In some embodiments, the memory 306 contains instructions that cause the processor 304 to, upon sensing a saturation level in a dryer media devices, generate a signal to run a generating device to produce a strong outward airflow, a strong inward airflow (i.e., a vacuum), or a combination thereof. In some embodiments, the step of sensing the saturation level and/or a dirt level is via a sensor that weighs the dryer media devices.

In some embodiments, the memory 306 contains instructions that cause the processor 304 to, upon sensing a saturation level and/or a dirt level in a dryer media devices, generate a signal to run a dryer media cleaning assembly to apply hot water, cold water, a cleaning agent, or a combination thereof to the dryer media devices. In some embodiments, the step of sensing the saturation level and/or a dirt level is via a sensor that weighs the dryer media devices.

In some embodiments, the memory 306 contains instructions that cause the processor 304 to, upon sensing a saturation level and/or a dirt level in a dryer media devices, generate a signal to run a dryer media cleaning assembly to apply hot water, cold water, a cleaning agent, or a combination thereof to the dryer media devices. The memory 306 may further include instructions to, after application of the dryer media cleaning assembly, to generate a signal to run a generating device to produce a strong outward airflow, a strong inward airflow (i.e., a vacuum), or a combination thereof.

In some embodiments, the memory 306 contains instructions that cause the processor 304 to, upon a predetermined number of cycles of the vehicle wash system, generate a signal to run a generating device to produce a strong outward airflow, a strong inward airflow (i.e., a vacuum), or a combination thereof.

In some embodiments, the memory 306 contains instructions that cause the processor 304 to, upon a predetermined number of cycles of the vehicle wash system, generate a signal to run a dryer media cleaning assembly to apply hot water, cold water, a cleaning agent, or a combination thereof to the dryer media devices. In some embodiments, the step of sensing the saturation level and/or a dirt level is via a sensor that weighs the dryer media devices.

In some embodiments, the memory 306 contains instructions that cause the processor 304 to, upon a predetermined amount of time, generate a signal to run a generating device to produce a strong outward airflow, a strong inward airflow (i.e., a vacuum), or a combination thereof.

In some embodiments, the memory 306 contains instructions that cause the processor 304 to, upon a predetermined amount of time, generate a signal to run a dryer media cleaning assembly to apply hot water, cold water, a cleaning agent, or a combination thereof to the dryer media devices. In some embodiments, the step of sensing the saturation level and/or a dirt level is via a sensor that weighs the dryer media devices.

In some embodiments, the memory 306 contains instructions that cause the processor 304 to, upon a predetermined scheduled event, generate a signal to run a generating device to produce a strong outward airflow, a strong inward airflow (i.e., a vacuum), or a combination thereof.

In some embodiments, the memory 306 contains instructions that cause the processor 304 to, upon a predetermined scheduled event, generate a signal to run a dryer media cleaning assembly to apply hot water, cold water, a cleaning agent, or a combination thereof to the dryer media devices. In some embodiments, the step of sensing the saturation level and/or a dirt level is via a sensor that weighs the dryer media devices.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle washing system, comprising:
a vehicle treatment area configured to receive a vehicle;
at least one dryer media device positioned in the vehicle treatment area and configured to dry the vehicle upon contact with the vehicle; and
an air moving assembly located adjacent to the at least one dryer media device in the vehicle treatment area and configured to remove moisture from the at least one dryer media device;
wherein the air moving assembly is configured to generate an outward airflow, an inward airflow, or a combination thereof to remove the moisture from the at least one dryer media device;
wherein the air moving assembly includes an array of apertures configured to pass the airflow therethrough; and
wherein the air moving assembly includes a nozzle manifold separate from the dryer media device and configured to be positioned adjacent to and overlying the at least one dryer media device, and wherein the nozzle manifold includes a face defining the array of apertures.

2. The vehicle wash system of claim 1, wherein the nozzle manifold includes an air connection that is fluidly connected to an air flow generating device that is configured to generate the outward airflow, the inward airflow or the combination thereof to the array of apertures.

3. The vehicle wash system of claim 1, wherein the at least one dryer media device is a rotary brush.

4. The vehicle wash system of claim 3, wherein the rotary brush includes a hub extending along a hub axis and being rotatable about the hub axis, and a plurality of media elements extending radially from the hub;
wherein a roller having a cylindrical shape extends along a length of the nozzle manifold along a roller axis extending parallel to the hub axis, and wherein during rotation of the dryer media device, a leading edge of the media elements contacts the roller prior to contacting the nozzle manifold.

5. The vehicle wash system of claim 1, wherein the face of the nozzle manifold is at least one of curved and angled.

6. The vehicle wash system of claim 1, wherein the nozzle manifold is moveable between an operable position wherein the face of the nozzle manifold is positioned adjacent to, or contacts the at least one dryer media device to position the apertures of the nozzle manifold adjacent to the dryer media device to effectuate removing the moisture from the dryer media device, and a stowed position wherein the nozzle manifold is spaced from the at least one dryer media device.

7. The vehicle wash system of claim 1, further including a dryer media cleaning assembly located adjacent to the at least one dryer media device and configured to apply a fluid to the at least one dryer media device to clean the at least one dryer media device.

8. The vehicle wash system of claim 1, wherein the at least one dryer media device is a mitter curtain.

9. The vehicle wash system of claim 1, wherein the dryer media device has at least one media element, and wherein the face of the nozzle manifold is positioned outwardly of the at least one media element.

10. The vehicle wash system of claim 1, wherein the plurality of apertures are arranged in a plurality of groups of the apertures, and wherein the groups of the apertures are spaced from one another along the face of the nozzle manifold.

11. A vehicle washing system, comprising:
a vehicle treatment area configured to receive a vehicle;
at least one dryer media device positioned in the vehicle treatment area and configured to dry the vehicle upon contact with the vehicle;
a nozzle manifold located adjacent to the at least one dryer media device in the vehicle treatment area and configured to remove moisture from the at least one dryer media device;
the nozzle manifold having an elongated face presenting a plurality of nozzles; and the nozzle manifold being moveable between an operable position where the face of the nozzle manifold is positioned adjacent to, or contacts the at least one dryer media device to position the nozzles of the nozzle manifold adjacent to the dryer media device to effectuate removing moisture from the dryer media device, and a stowed position where the nozzle manifold is spaced from the at least one dryer media device.

12. The vehicle wash system of claim 11, wherein the plurality of nozzles are arranged in a plurality of groups of the nozzles, and wherein the groups of the nozzles are spaced from one another along the face of the nozzle manifold.

13. The vehicle wash system of claim 11, wherein the dryer media device has at least one media element, and wherein the face of the nozzle manifold is positioned outwardly of the at least one media element when the nozzle manifold is in the stowed position.

14. The vehicle wash system as set forth in claim 11, wherein the face of the nozzle manifold is at least one of curved and angled between the top and bottom edges of the face.

\* \* \* \* \*